(12) United States Patent
Hori et al.

(10) Patent No.: US 6,233,219 B1
(45) Date of Patent: May 15, 2001

(54) RECORDING MEDIUM AND REPRODUCING APPARATUS THEREFOR

(75) Inventors: Yoshihiro Hori, Gifu; Hisashi Matsuyama, Ogaki, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/180,873

(22) PCT Filed: Oct. 30, 1997

(86) PCT No.: PCT/JP97/03950

§ 371 Date: Nov. 24, 1998

§ 102(e) Date: Nov. 24, 1998

(87) PCT Pub. No.: WO98/54703

PCT Pub. Date: Dec. 3, 1998

(30) Foreign Application Priority Data

May 28, 1997 (JP) .................................................. 9-138365

(51) Int. Cl.[7] ...................................................... G11B 7/24
(52) U.S. Cl. .......................................................... 369/275.4
(58) Field of Search ............................. 369/275.4, 275.2, 369/275.1; 428/64.4; 430/320, 321

(56) References Cited

U.S. PATENT DOCUMENTS

| | | | |
|---|---|---|---|
| 5,303,216 | * 4/1994 | Shinoda et al. | 369/44.13 |
| 5,463,614 | * 10/1995 | Morita | 369/275.4 |
| 5,537,373 | * 7/1996 | Horikiri | 369/44.13 |
| 5,604,726 | * 2/1997 | Karube | 369/275.4 |
| 5,715,217 | * 2/1998 | Fuji | 369/44.26 |
| 5,820,795 | * 10/1998 | Takemori et al. | 264/1.36 |
| 5,844,883 | * 12/1998 | Kanno et al. | 369/275.4 |
| 5,991,259 | * 11/1999 | Nakayama et al. | 369/275.4 |

FOREIGN PATENT DOCUMENTS

| | | |
|---|---|---|
| 0 414 518 A2 | 2/1991 | (EP) . |
| 2-68721 | 3/1990 | (JP) . |
| 3-83234 | 4/1991 | (JP) . |
| 5-54410 | 3/1993 | (JP) . |
| 5-314538 | 11/1993 | (JP) . |
| 7-73508 | 3/1995 | (JP) . |
| 9-120584 | 5/1997 | (JP) . |
| 9-219024 | 8/1997 | (JP) . |
| 10-208305 | 8/1998 | (JP) . |
| 10-320784 | 12/1998 | (JP) . |

OTHER PUBLICATIONS

Copy of Japanese Patent Office Action for corresponding Japanese Patent Application No. 10–520301, including translation, mailed Apr. 18, 2000.

Copy of Japanese Patent Office Action for corresponding Japanese Patent Application No. 10–520301, including translation, mailed Aug. 29, 2000.

* cited by examiner

*Primary Examiner*—Tan Dinh
(74) *Attorney, Agent, or Firm*—Armstrong, Westerman, Hattori, McLeland & Naughton, LLP

(57) ABSTRACT

An optical recording medium in which any of a land (4, 41, 42) and a groove (3, 31–33) is scanned using a laser beam, the address information of data recorded or to be recorded in the land or groove is available, the address information of the groove (31–33) is recorded in a first address information region (11) in an address region (1) on a sidewall of the groove as a wobble (51, 53, 55) and the address information of the land (41, 42) is recorded in a second address information region (12) in the address region (1) on a sidewall of the land as a wobble (52, 54).

13 Claims, 25 Drawing Sheets

RECORDING MEDIUM AND REPRODUCING APPARATUS THEREFOR

BACKGROUND OF THE INVENTION

1. Field of the Invention

The present invention relates to a recording medium to/from which data can be recorded and reproduced, and a reproducing apparatus therefor.

2. Description of the Related Art

Magneto-optical recording media have been recently known as recording media to/from which data can be recorded and reproduced at high density, and in such a medium, tracks of lands and grooves are formed. Data is recorded and reproduced to/from the lands and grooves.

Address information is recorded as wobbles at a sidewall of a groove in an address region rather than a usual magneto-optical signal, and a data region is formed adjacent to the address region in the magneto-optical recording medium. In the data region, clocking wobbles different from the wobbles formed according to the address information are formed at one or both sidewalls of the groove. The clocking wobbles formed in the data region are reproduced, and a synchronizing signal for recording or reproducing a data signal is generated from thus reproduced wobble signal.

Since data is reproduced from a magneto-optical recording medium conventionally by irradiating the medium with three beams, and if address information is recorded by wobbling a sidewall of a groove in the magneto-optical recording medium, the address information corresponding to data recorded or to be recorded at the groove may be recorded but address information corresponding to data recorded or to be recorded at a land is not available by reproducing data from the land, because the waveforms of wobbles formed at both sidewalls of the land are different from each other.

SUMMARY OF THE INVENTION

It is an object of the present invention to provide a recording medium from which address information can be reproduced both at a land and a groove, and a reproducing apparatus therefor.

The object of the invention is achieved by providing a recording medium as follows: the recording medium includes a substrate having a main surface, the substrate includes a groove formed at the main surface and a land formed at the main surface and adjacent to the groove, and the land has first and second sidewalls wobbled according to the address of data recorded or to be recorded in the land.

Another object of the invention is achieved by providing a recording apparatus including first and second detectors provided in series in the tangential direction of a track for generating first and second detection signals, respectively based on detected reflected light, a subtracter for subtracting the second detection signal from the first detection signal, thereby generating a clock signal, third and fourth detectors provided in series in the tracking direction for generating third and fourth detection signals, respectively, according to detected reflected light, and an address information reproducing circuit for reproducing address information by performing addition/subtraction between the third and fourth detection signals.

An advantage of the present invention resides in that the address information may be accurately reproduced by irradiating a single beam of laser light.

DETAILED DESCRIPTION OF THE PREFERRED EMBODIMENTS

Figure 1:
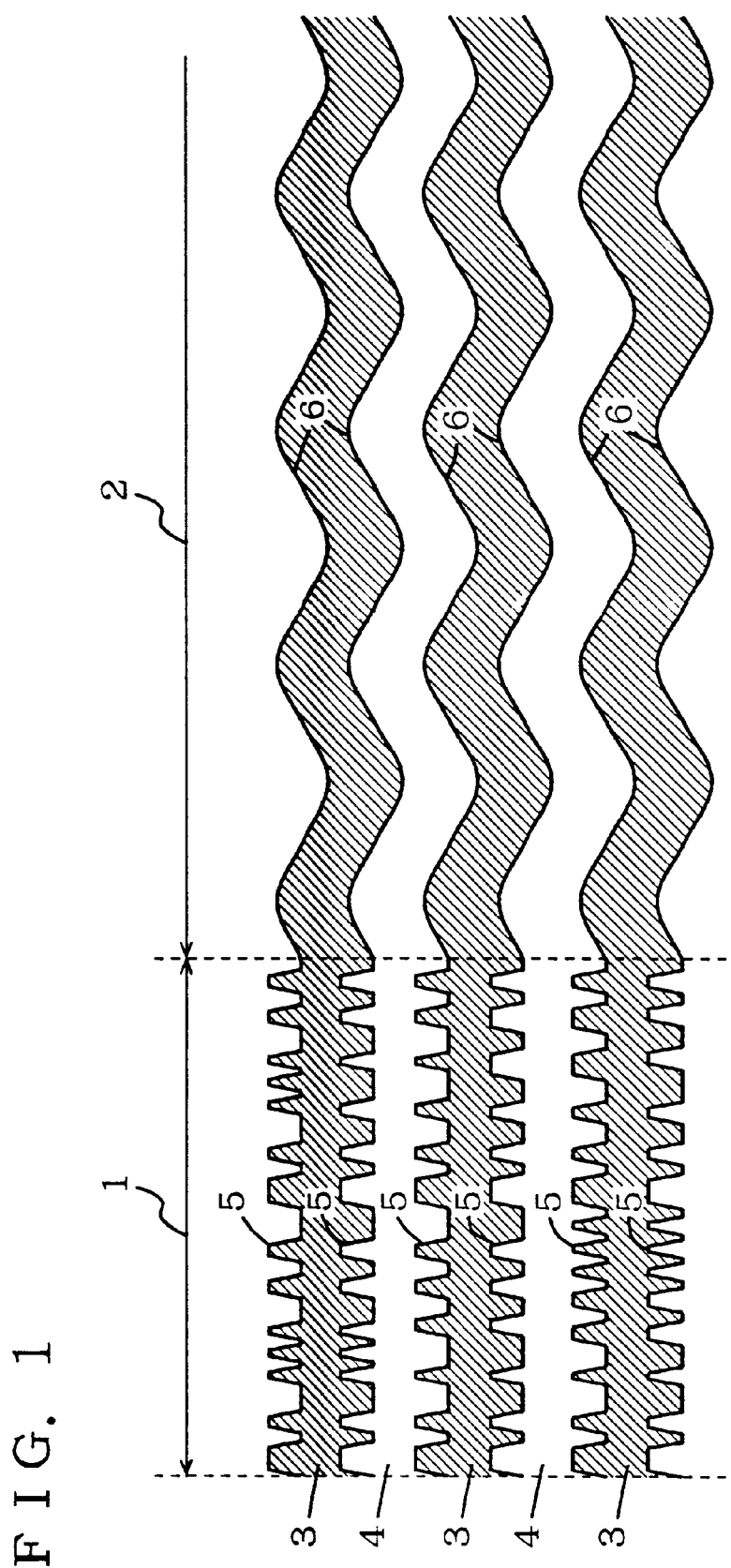
FIG. 1 is a plan view showing the structure of tracks in an optical recording medium according to a first embodiment of the invention.

A recording medium and a reproducing apparatus therefor according to the present invention will be now described in detail by referring to the accompanying drawings, in which the same reference characters represent the same or corresponding portions.

First Embodiment

FIG. 1 is a plan view showing the structure of tracks in an optical recording medium according to a first embodiment of the invention. Note that optical recording media according to the following embodiments are all formed of a substrate having a main surface, on which tracks are formed.

As shown in FIG. 1, the optical recording medium includes an address region 1 and a data region 2. Wobbles 5 according to address information are formed on both sidewalls of each of grooves 3 formed in address region 1. This also means that wobbles 5 are formed on both sidewalls of lands 4.

Meanwhile, docking wobbles 6 in phase are formed on both sidewalls of each of grooves 3 formed in data region 2, and a clock used for recording or reproducing data to/from the recording medium is generated based on clocking wobble 6.

Figure 2:
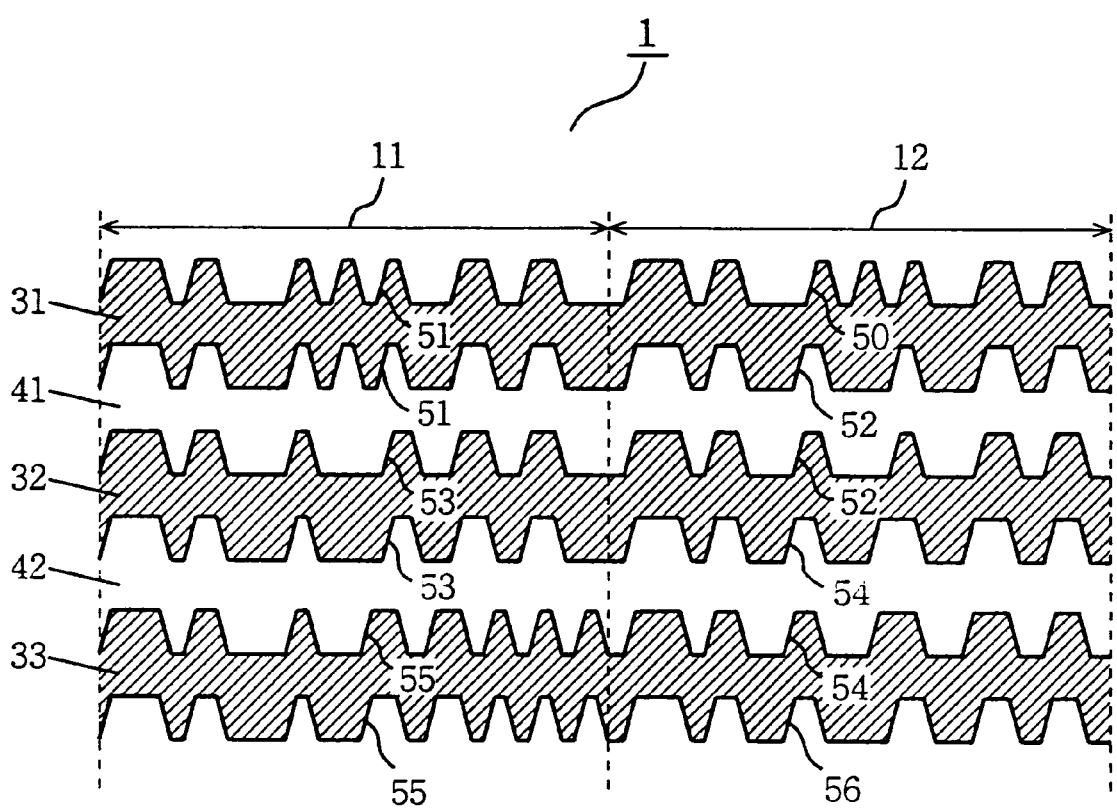
FIG. 2 is a plan view showing in detail the structure of tracks in the address region shown in FIG. 1.

FIG. 2 is a plan view showing in more detail the structure of tracks in address region 1 shown in FIG. 1. As shown in FIG. 2, address region 1 includes a first address information region 11 and a second address information region 12. In general, when a groove or land, both sidewalls of which are wobbled, is scanned with a laser beam, the waveforms of wobbles formed on both sidewalls cannot be reproduced if the waveforms are different. Thus, wobbles 51 in phase are formed on both sidewalls of a groove 31 in first address information region 11, and wobbles 50 and 52 out of phase from each other are formed on both sidewalls in second address information region 12.

Thus, when a groove 31 is scanned with a laser beam, a reproducing signal may be obtained by wobble 51 formed in address information region 11, but a reproducing signal is not obtained by wobbles 50 and 52 formed in second address information region 12. As a result, the address information of data recorded or to be recorded in the data region of groove 31 is recorded as wobble 51 in first address information region 11.

Now, in the first address information region 11 of a land 41 adjacent to groove 31, a wobble 51 is formed on one side wall, and a wobble 53 having a different waveform from wobble 51 is formed on the other sidewall. In the second address information region 12 of land 41, wobbles 52 in phase are formed on both sidewalls of the land. As a result, the address information of data recorded or to be recorded in the data region of land 41 is recorded as wobbles 52 formed in the second address information region 12 of land 41.

In the first address information region 11 of a groove 32 adjacent to land 41, wobbles 53 in phase are formed on both sidewalls, a wobble 52 is formed on one sidewall in second address information region 12, and a wobble 54 having a different waveform from wobble 52 is formed on the other sidewall. As a result, the address information of data recorded or to be recorded in the data region of grooves 32 is recorded as a wobble 53 formed in the first address information region 11 of groove 32.

Further, in the first address information region 11 of a land 42 adjacent to groove 32, a wobble 53 is formed on one sidewall, and a wobble 55 having a different waveform from wobble 53 is formed on the other sidewall, and wobbles 54 in phase are formed on both sidewalls of land 42 in second address information region 12. As a result, the address information of data recorded or to be recorded in land 42 is recorded as wobbles 54 formed on both sidewalls of the second address region 12 of land 42.

Furthermore, in the first address information region 11 of a groove 33 adjacent to land 42, wobbles 55 in phase are formed on both sidewalls of groove 33, a wobble 54 is formed on one sidewall of second address information region 12, and a wobble 56 is formed on the other sidewall. As a result, the address information of data recorded or to be recorded in groove 33 is recorded as wobbles 55 formed on both sidewalls of groove 33 in first address information region 11.

Figure 3:
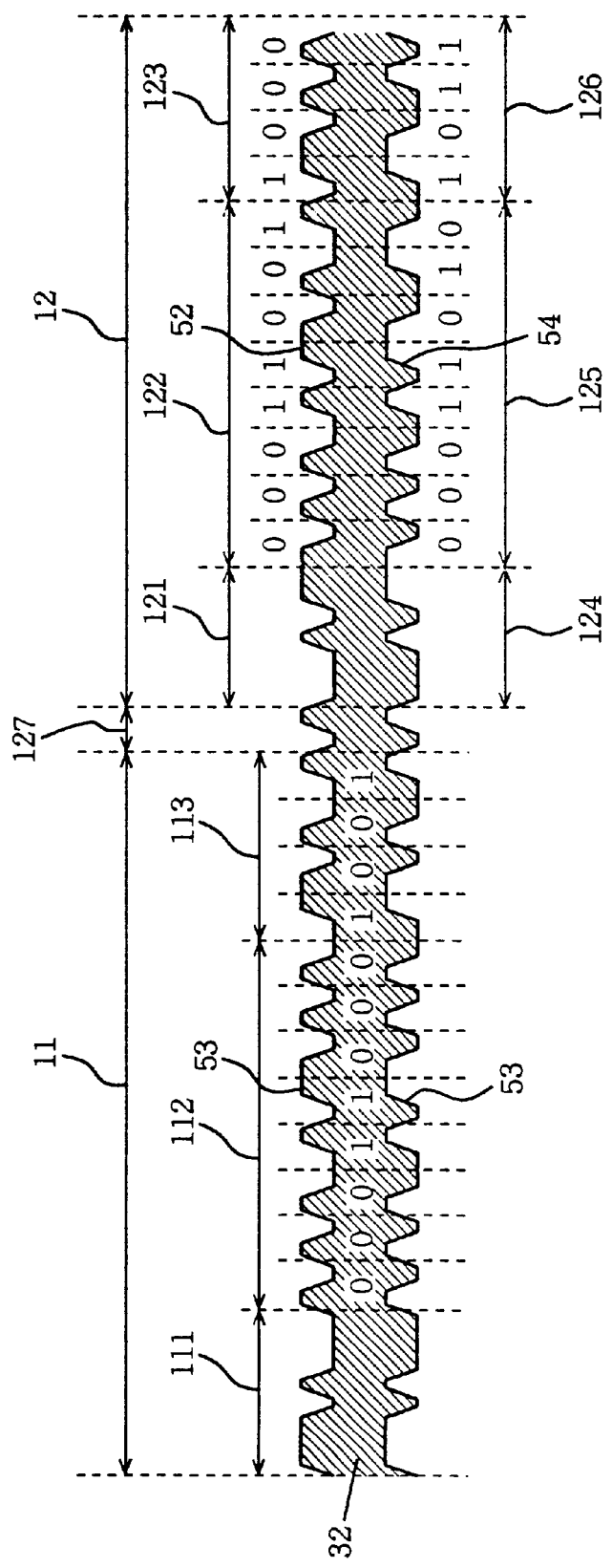
FIG. 3 is a view showing the format of address information recorded in the address region shown in FIG. 2.

FIG. 3 is a view showing the recording format of address information in groove 32 shown in FIG. 2. As shown in FIG. 3, the recording format of address information includes first address information region 11, a region 127, and second address information region 12. Herein, first address information 11 includes a 4-bit detection pattern (SYNC) 111, 8-bit address information 112, and a 4-bit error detection code (CRC) 113. Among them, address information 112 and error detection code (CRC) 113 are recorded by wobbling sidewalls of groove 32 by performing bi-phase conversion, wherein a falling edge from "1" to "0" and a rising edge from "0" to "1" are allocated to information "0" and "1", respectively.

Similarly, wobble 52 is formed on one sidewall of groove 32 in second address information region 12, and wobble 52 includes a detection pattern SYNC) 121 for the address information of data recorded or to be recorded in land 41 adjacent to groove 32, the address information 122 of data recorded or to be recorded in land 41, and an error detection code (CRC) 123.

Wobble 54 is formed on the other sidewall of groove 32 in second address information region 12, and wobble 54 includes a detection pattern (SYNC) 124 for the address information of data recorded or to be recorded in land 42 adjacent to groove 32, the address information 125 of the data recorded or to be recorded in land 42 and an error detection code (CRC) 126.

Herein, pieces of address information 122 and 125 are 8-bit information similarly to address information 112, and recorded as bi-phase converted wobbles 52 to 54. Further, a signal "11101000" which is not generated by bi-phase conversion is set as detection pattern (SYNC) 111 for address information 112, signal "00010111" is set as detection patterns (SYNC) 121 and 124 for address informations 122 and 125. A region 127 with no information recorded therein existing between first address information region 11 and second address information region 12 serves as an adjustment bit for surely detecting detection patterns (SYNC) 121 and 124 in the second address information region, and has a capacity of 1 bit.

Note that in the foregoing, use of an error correction code in place of the error detection code (CRC) may be similarly applied.

As described above, in the optical recording medium according to the first embodiment of the invention, since wobbles 51 to 55 in phase are formed on both sidewalls of each of grooves 31, 32 and 33 or for each of lands 41 and 42, the address information of data recorded or to be recorded in a groove or a land and to be scanned by a laser beam may be recorded for each groove or land, so that the address information in the groove or land may be surely detected by a single laser beam.

Second Embodiment

Figure 4:
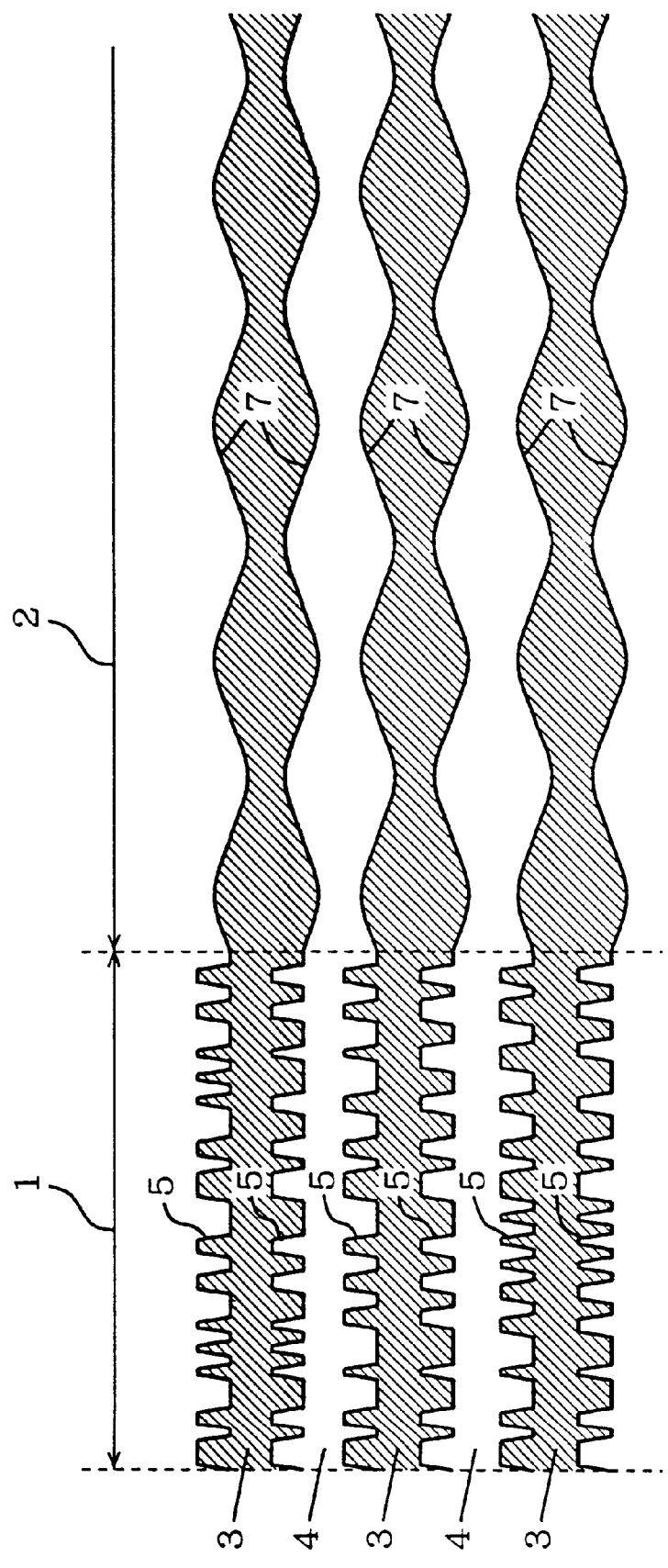
FIG. 4 is a plan view showing the structure of tracks in an optical recording medium according to a second embodiment of the invention.

FIG. 4 is a plan view showing the structure of tracks in an optical recording medium according to a second embodiment of the invention. As shown in FIG. 4, the optical recording medium has a similar track structure to the optical recording medium according to the first embodiment, but the track structure in data region 2 is different. More specifically, in the data region 2 of the optical recording medium according to this embodiment, clocking wobbles 7 are symmetrically formed on both sidewalls of a groove 3 with respect to the central line of groove 3. Based on clocking wobbles 7, a synchronizing signal used at the time of recording/reproducing data is generated.

Third Embodiment

Figure 5:
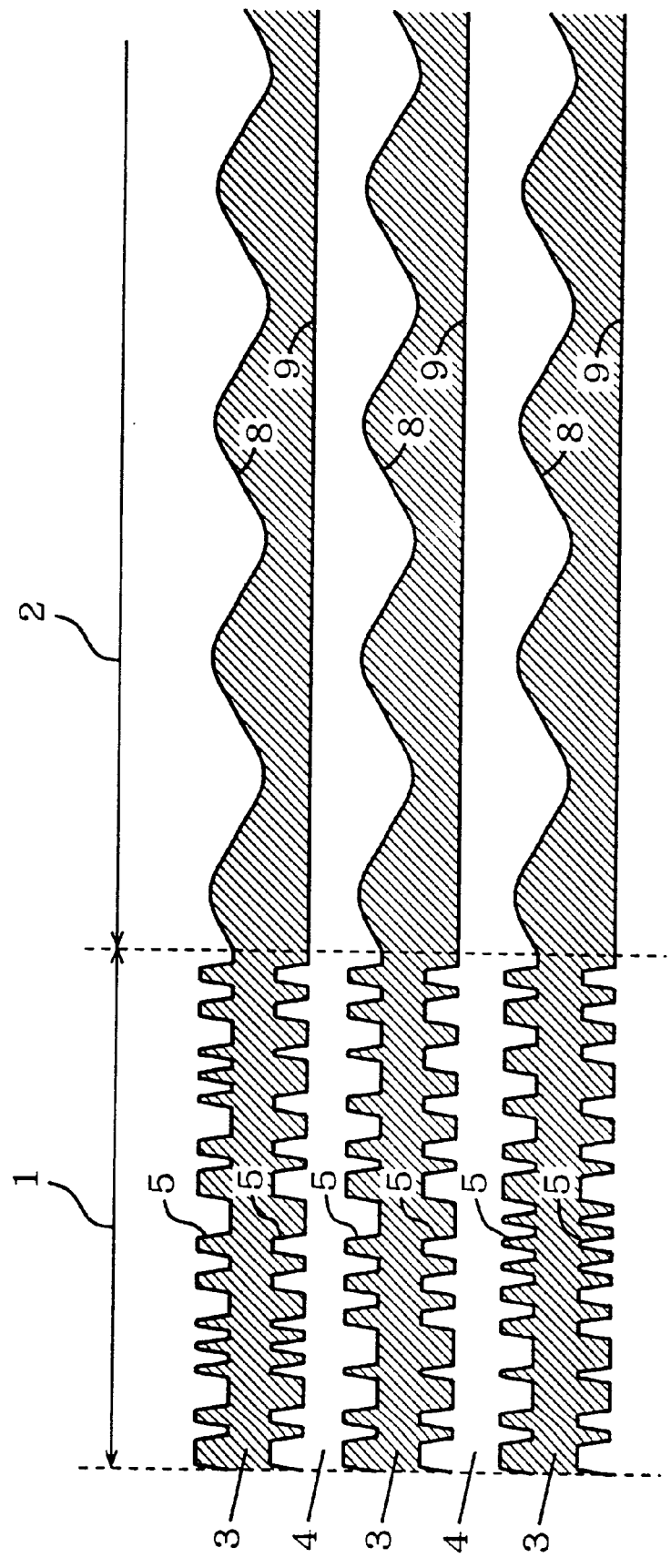
FIG. 5 is a plan view showing the structure of tracks in an optical recording medium according to a third embodiment of the invention.

FIG. 5 is a plan view showing the structure of tracks in an optical recording medium according to a third embodiment of the invention. As shown in FIG. 5, the optical recording medium has a track structure similar to the optical recording medium according to the second embodiment, but the structure of tracks in data region 2 is different. More specifically, in data region 2 in the optical recording medium according to this embodiment, clocking wobbles 8 having periodicity are formed on one sidewall of a groove 3, and the other sidewall 9 is not wobbled or flat. In such an optical recording medium, a clock signal is generated based on clocking wobbles 8 having periodicity.

Fourth Embodiment

Figure 6:
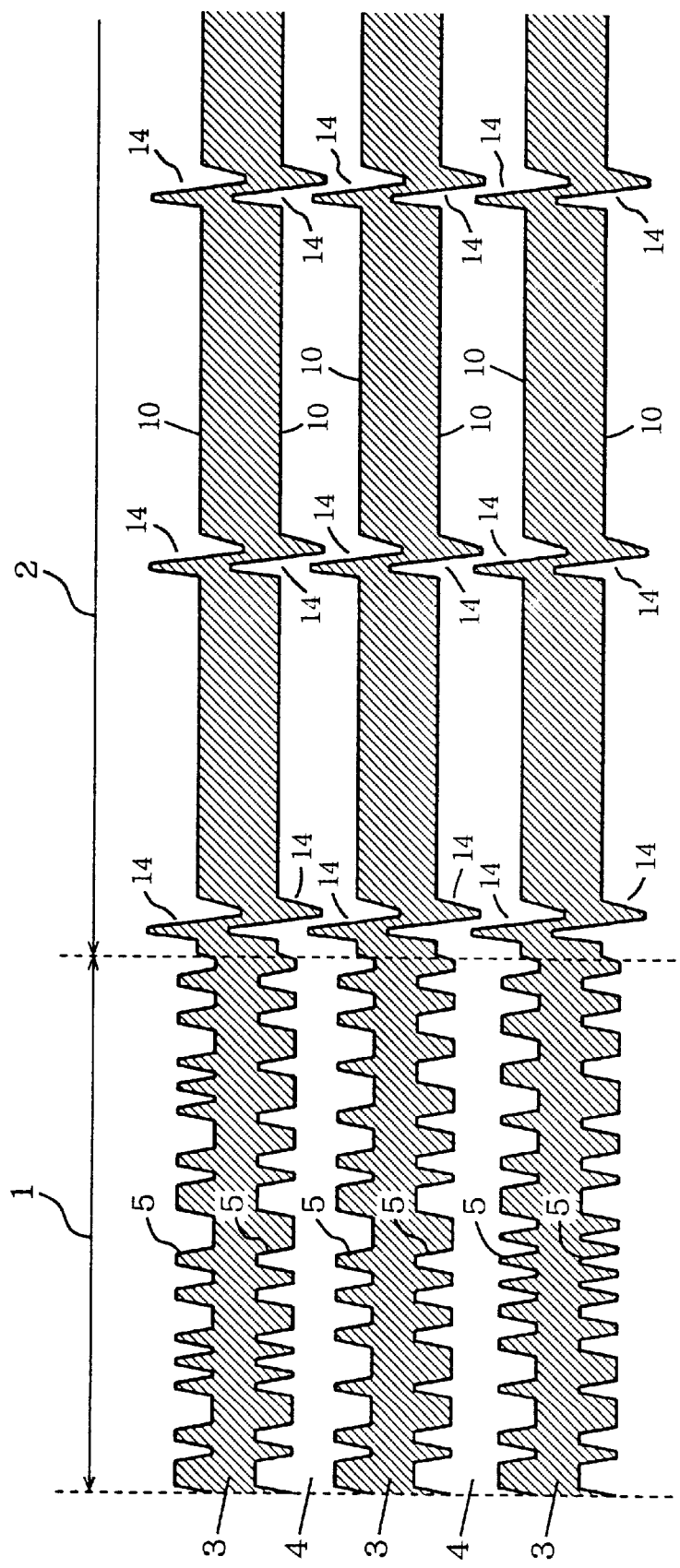
FIG. 6 is a plan view showing the structure of tracks in an optical recording medium according to a fourth embodiment of the invention.

FIG. 6 is a plan view showing the structure of tracks in an optical recording medium according to a fourth embodiment of the invention. As shown in FIG. 6, the optical recording medium has a similar track structure to the optical recording medium according to the first embodiment, but the structure of tracks in data region 2 is different. More specifically, in data region 2 in the optical recording medium according to this invention, fine clock marks 14 are formed at prescribed intervals on both sidewalls 10 of a groove. In the optical recording medium, a clock signal used for recording and reproducing data is generated based on fine clock marks 14.

Fifth Embodiment

Figure 7:
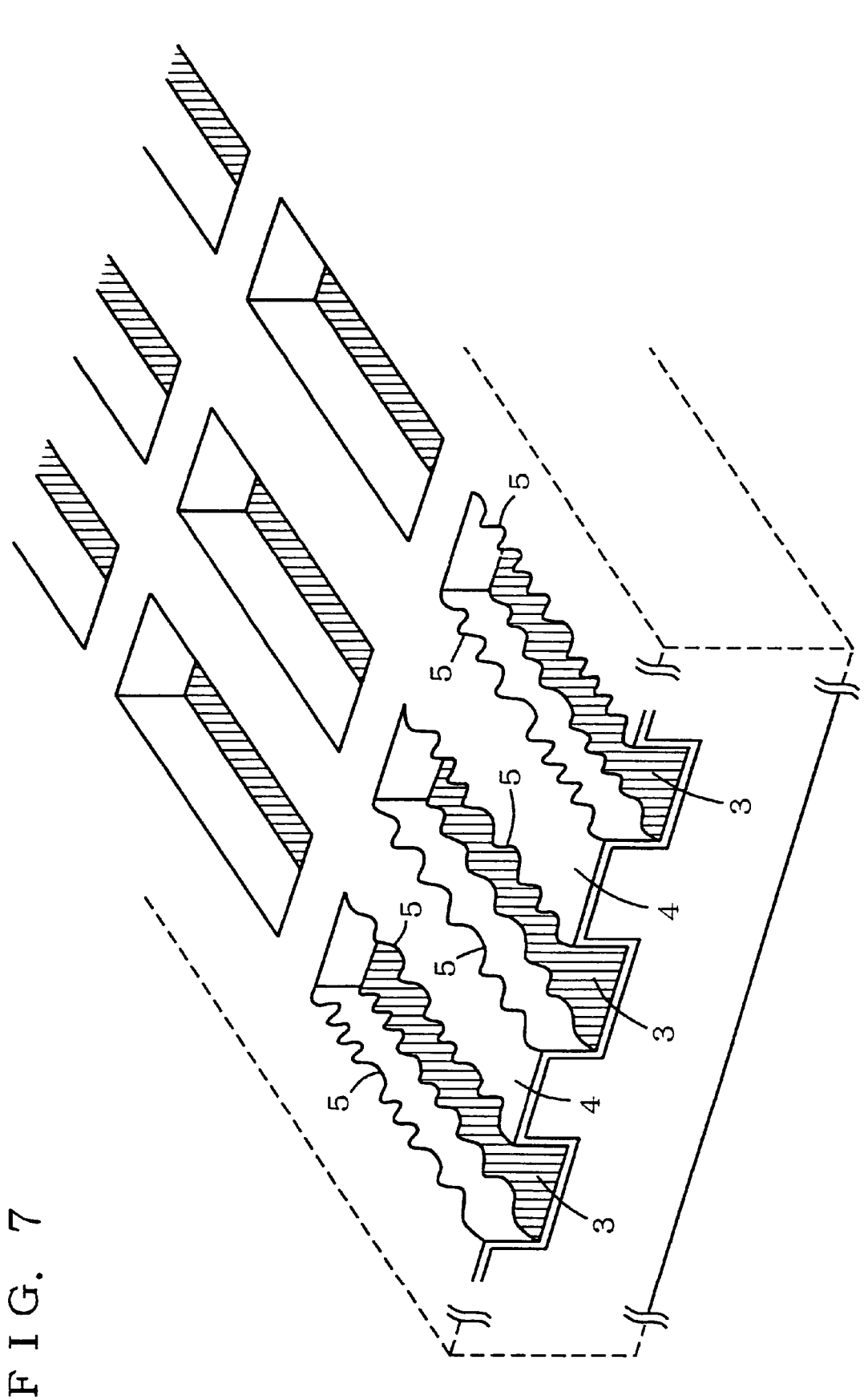
FIG. 7 is a perspective view showing the structure of tracks in an optical recording medium according to a fifth embodiment of the invention.
Figure 8:
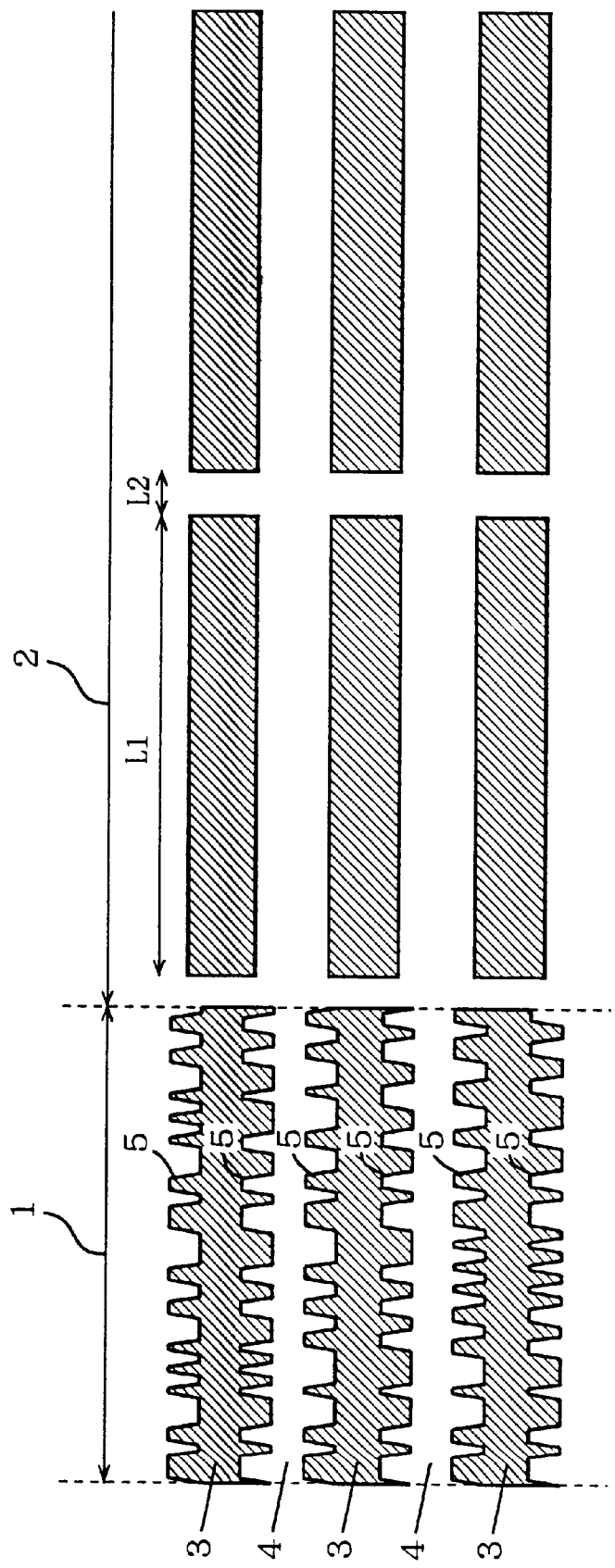
FIG. 8 is a plan view showing the structure of tracks in the optical recording medium shown in FIG. 7.

FIG. 7 is a perspective view showing the structure of tracks in an optical recording medium according to a fifth embodiment of the invention, and FIG. 8 is a plan view showing the structure of tracks in the optical recording medium according to this embodiment. As shown in FIG. 8, the optical recording medium has a similar track structure to the optical recording medium according to the first embodiment, but the structure of tracks in data region 2 is different. More specifically, in data region 2 in the optical recording medium according to this embodiment, a groove 3 having a length of L1 is formed at an interval of L2 in the track direction. As a result, in data region 2, grooves are intermittently and periodically formed, so that a clock signal is generated by reproducing data region 2 having such a structure.

Sixth Embodiment

Figure 9:
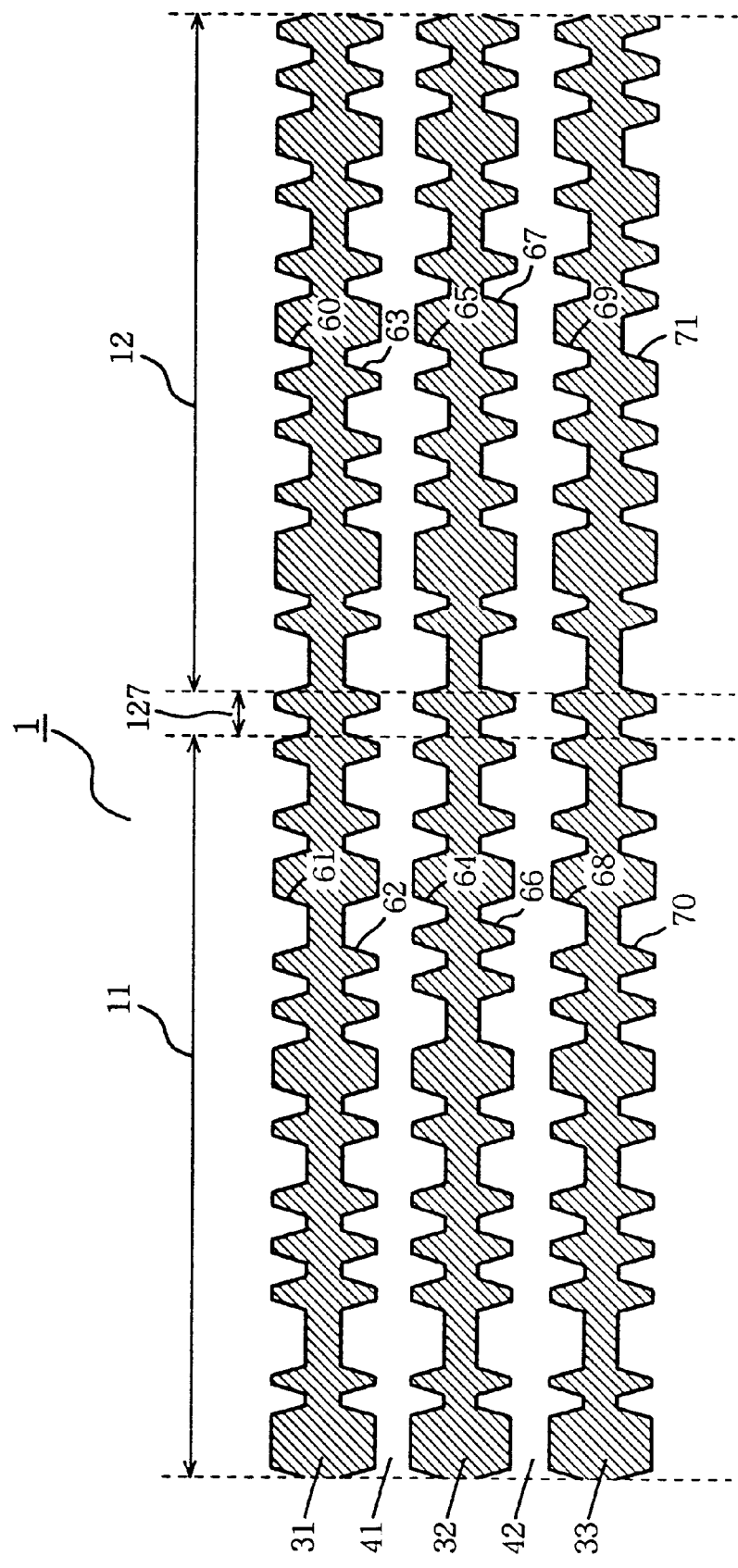
FIG. 9 is a plan view showing the structure of tracks in an address region in an optical recording medium according to a sixth embodiment of the invention.

FIG. 9 is a plan view showing the structure of tracks in address region 1 in an optical recording medium according to a sixth embodiment of the invention. As shown in FIG. 9, address region 1 includes a first address information region 11, a region 127 and a second address information region 12.

Herein, a wobble 61 is formed on one sidewall of a groove 31 in first address information region 11, and a wobble 62 is formed on the other sidewall of groove 31 symmetrically to wobble 61 with respect to the central line of groove 31. A wobble 60 is formed on that one sidewall of groove 31 in second address information region 12, and a wobble 63 assymetrical to wobble 60 is formed on the other sidewall.

Herein, by irradiating a laser beam, address information may be reproduced from symmetrically formed wobbles 61 and 62, while address information cannot be reproduced from assymetrically formed wobbles such as wobbles 60 and 63. Therefore, the address information of data recorded or to be recorded in the data region of groove 31 (not shown) is recorded as wobbles 61 and 62 symmetrically formed on both sidewalls of groove 31 in first address information region 11.

Now, wobble 62 is formed on one sidewall of a land 41 adjacent to groove 31 in first address information region 11 and a wobble 64 assymetrical to wobble 62 is formed on the other sidewall. Symmetrical wobbles 63 and 65 with respect to the central line of land 41 are formed in second address information region 12 in land 41. As a result, the address information of data recorded or to be recorded in the data region of land 41 (not shown) is recorded as wobbles 63 and 65 formed symmetrically in second address information region at land 41.

Wobbles 64 and 66 are formed symmetrically with respect to the central line of groove 32 on both sidewalls of groove 32 adjacent to land 41 in first address information region 11. A wobble 65 is formed on one sidewall in second address information region 12, and a wobble 67 assymetrical to wobble 65 is formed on the other sidewall. As a result, the address information of data recorded or to be recorded in groove 32 is recorded as wobbles 64 and 66 formed symmetrically in first address information region 11 at groove 32.

Furthermore, on both sidewalls of land 42 adjacent to groove 32 in first address information region 11, wobble 66, and a wobble 68 asymmetrical to wobble 66 are formed, and wobbles 67 and 69 symmetrical with respect to the central line of land 42 are formed on both sidewalls in second address information region 12. As a result, the address information of data recorded or to be recorded in land 42 is recorded as wobbles 67 and 69 symmetrically formed in second address information region 12.

Furthermore, on sidewalls of groove 33 adjacent to land 42 in first address information region 11, wobbles 68 and 70 are symmetrically formed with respect to the central line of groove 33, and on both sidewalls in second address information region 12, wobble 69 and a wobble 71 asymmetrical to wobble 69 are formed. As a result, the address information of data recorded or to be recorded in groove 33 is recorded as wobbles 68 and 70 formed symmetrically in first address information region 11.

Figure 10:
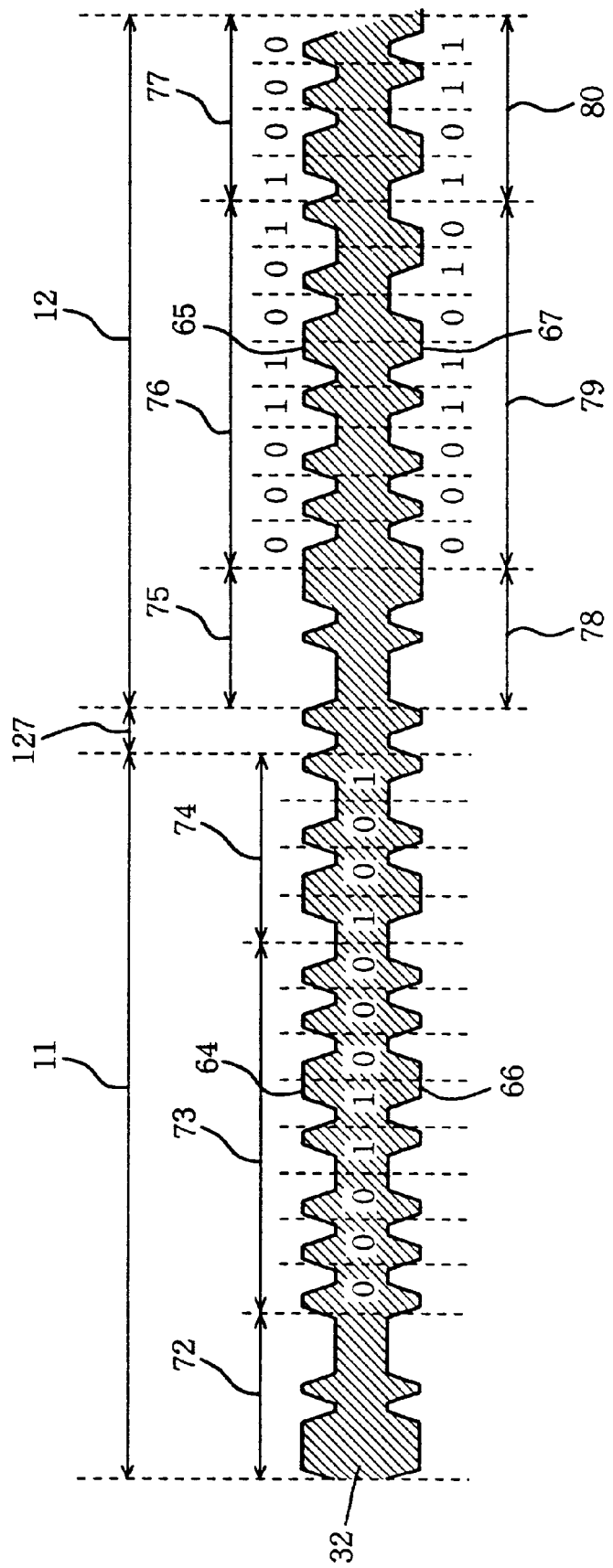
FIG. 10 is a view showing the format of address information recorded in the address region shown in FIG. 9.

FIG. 10 is a view showing the format of address information recorded in the address region shown in FIG. 9. As shown in FIG. 10, groove 32 in first address information region 11 includes a 4-bit detection pattern (SYNC) 72, 8-bit address information 73, and a 4-bit error detection code (CRC) 74. Herein, address information 73 and error detection code (CRC) 74 are recorded by wobbles after bi-phase conversion wherein a falling edge from "1" to "0" and a rising edge from "0" to "1" are allocated to information "0" and "1", respectively. Similarly, wobble 65 is formed on one sidewall in second address information region 12, and a detection pattern (SYNC) for the address information of data recorded or to be recorded in land 41 adjacent to groove 32, the address information of the data recorded or to be recorded in land 41, and an error detection code (CRC) 77 are included therein.

Wobble 67 is formed on the other sidewall of groove 32 in second address information region 12, and a detection pattern (SYNC) 78 for the address information of data recorded or to be recorded in land 42 adjacent to groove 32, the address information 79 of the data recorded or to be recorded in land 42, and an error detection code (CRC) 80 are included. Herein, address informations 76 and 79 are 8-bit information similarly to address information 73, and recorded by bi-phase converted wobbles. Herein, a signal "11101000" which is not generated by bi-phase conversion is set as detection pattern (SYNC) 72 for address information 73 and a signal "00010111" is set as detection patterns (SYNC) 75 and 78 for address information 76 and 79.

Note that, in the foregoing, use of an error correction code in place of the error detection code (CRC) may be similarly applied.

As described above, in the optical recording medium according to the sixth embodiment, in one of first and second address information regions 11 and 12 included in address region 1, both sidewalls of a land or groove are symmetrically wobbled according to the address information of data recorded or to be recorded in the land or groove, and therefore the address information of the data recorded or to be recorded in the land or groove may be surely reproduced by irradiating a single laser beam.

Seventh Embodiment

Figure 11:
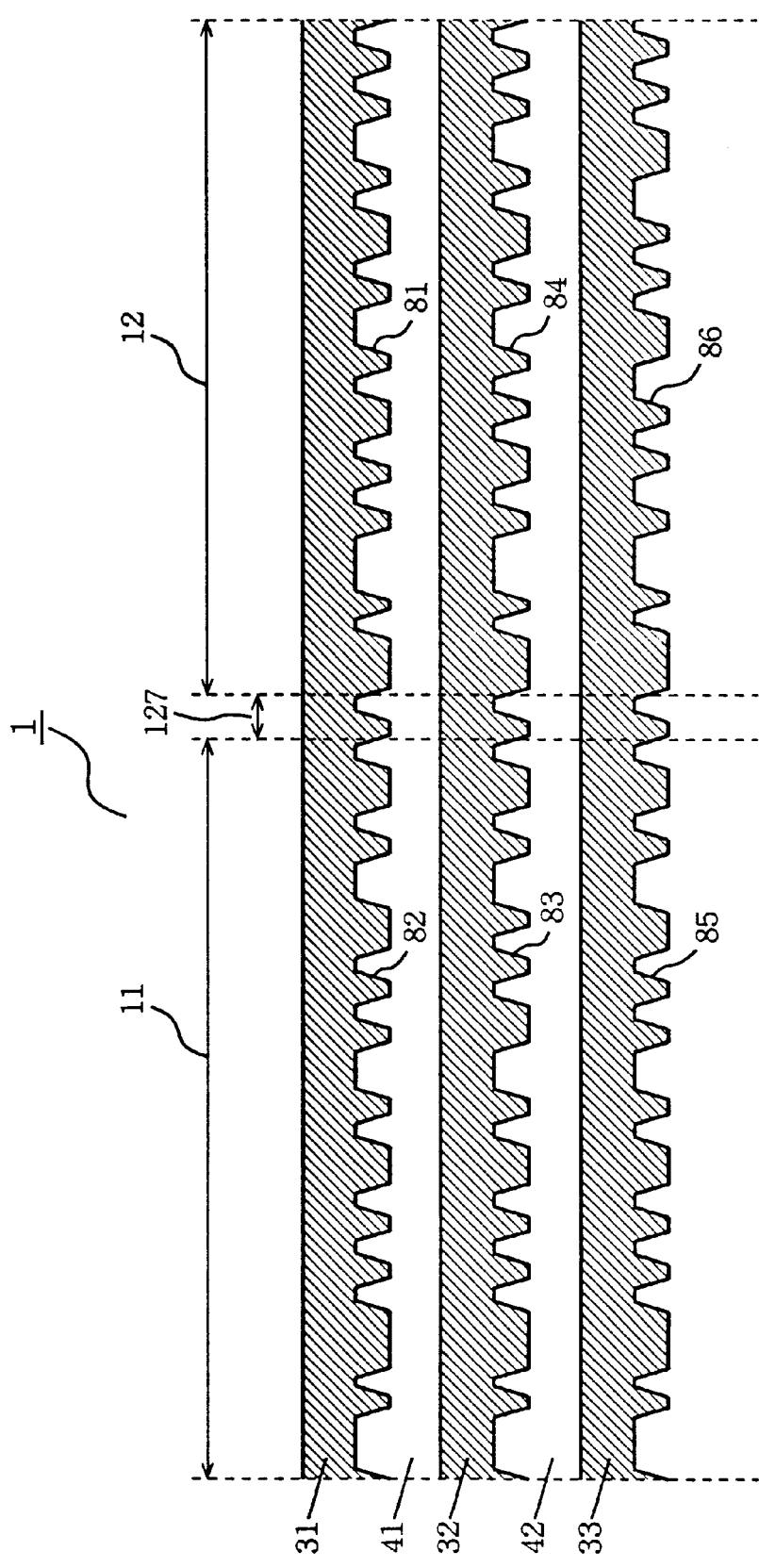
FIG. 11 is a plan view showing the structure of tracks in an address region in an optical recording medium according to a seventh embodiment of the invention.

FIG. 11 is a plan view showing the structure of tracks in address region 1 in an optical recording medium according to a seventh embodiment of the invention. As shown in FIG. 11, address region 1 includes a first address information region 11 and a second address information region 12. A wobble 82 is formed on one sidewall of groove 31 in first address information region 11, and a wobble 81 is formed on a sidewall on the same side in second address information region 12. The other sidewall of groove 31 is not wobbled or flat throughout first and second address information regions 11 and 12. Herein, wobble 82 is formed according to the address information of data recorded or to be recorded in groove 31, and wobble 81 is formed according to the address information of data recorded or to be recorded in land 41 adjacent to groove 31.

Similarly, a wobble 83 is formed on one sidewall of groove 32 in first address information region 11, and a wobble 84 is formed on a sidewall on the same side in second address information region 12, the other sidewall of groove 32 is not wobbled or flat throughout first and second address information regions 11 and 12. Herein, wobble 83 is formed according to the address information of data recorded or to be recorded in groove 32, and wobble 84 is formed according to the address information of data recorded or to be recorded in land 42 adjacent to groove 32.

A wobble 85 is formed on one sidewall of a groove 33 in first address information region 11, a wobble 86 is formed on a sidewall on the same side in second address information region 12, and the other sidewall of groove 33 is not wobbled or flat throughout first and second address information regions 11 and 12. Herein, wobble 85 is formed according to the address information of data recorded or to be recorded in groove 33, and wobble 86 is formed according to the address information of data recorded or to be recorded in a land (not shown) adjacent to groove 33.

Figure 12:
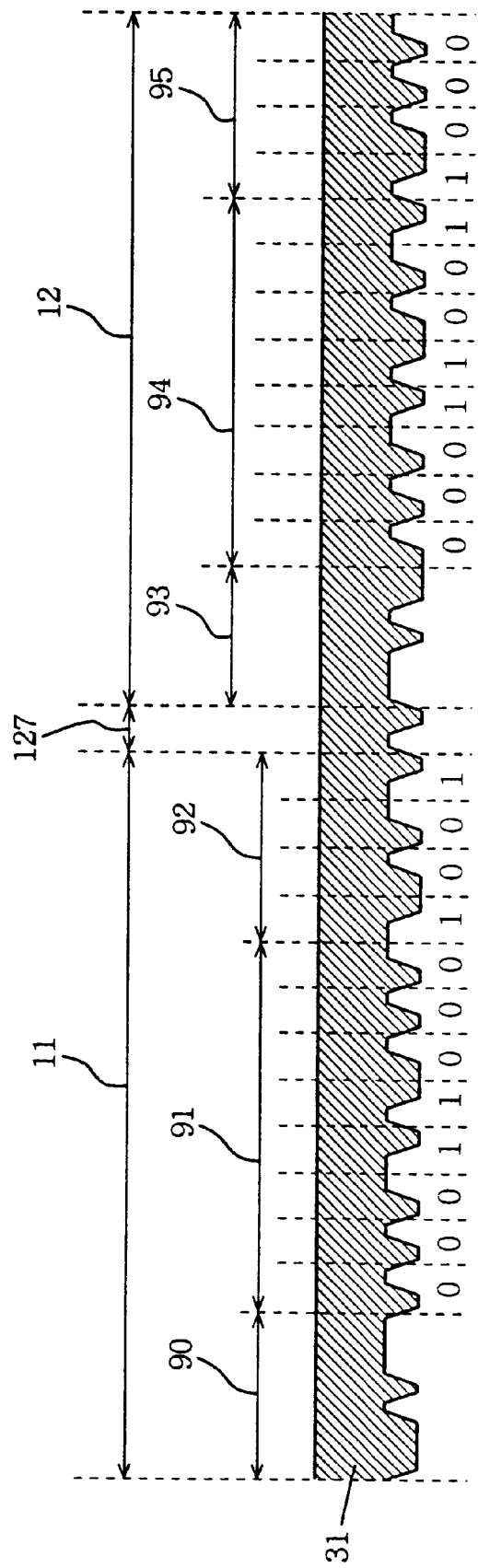
FIG. 12 is a view showing the format of address information recorded in the address region shown in FIG. 11.

FIG. 12 is a view showing the format of address information recorded in address region 1. As shown in FIG. 12, the first address information region 11 of groove 31 includes a 4-bit detection pattern (SYNC) 90, 8-bit address information 91, and a 4-bit error detection code (CRC) 92. Groove 31 in second address information region 12 includes a 4-bit detection pattern (SYNC) 93, 8-bit address information 94, and a 4-bit error detection code (CRC) 95. Note that the method of recording address information 91 and 94 is the same as the method described in the above embodiments.

During reproducing data from the optical recording medium according to the seventh embodiment of the invention, if, for example, groove 31 is scanned by an irradiated laser beam, address information 91 included in first address information region 11 and address information 94 included in second address information region 12 are detected, and by detecting detection patterns 90 and 93, it may be identified whether detected address information 91 and 94 are the address information of data recorded or to be recorded in groove 31 or the address information of data recorded or to be recorded in land 41, because detection pattern 90 and detection pattern 93 are symmetrical to each other. More specifically, if groove 31 is scanned with a laser beam during reproducing data, address information 91 detected immediately after detection pattern 90 is recognized as the address information of data recorded or to be recorded in groove 31, while if land 41 is scanned with a laser beam, address information 94 detected immediately after detection pattern 93 is recognized as the address information of data recorded or to be recorded in land 41.

Note that use of an error correction code in place of the error detection code (CRC) may be similarly applied.

Eighth Embodiment

Figure 13:
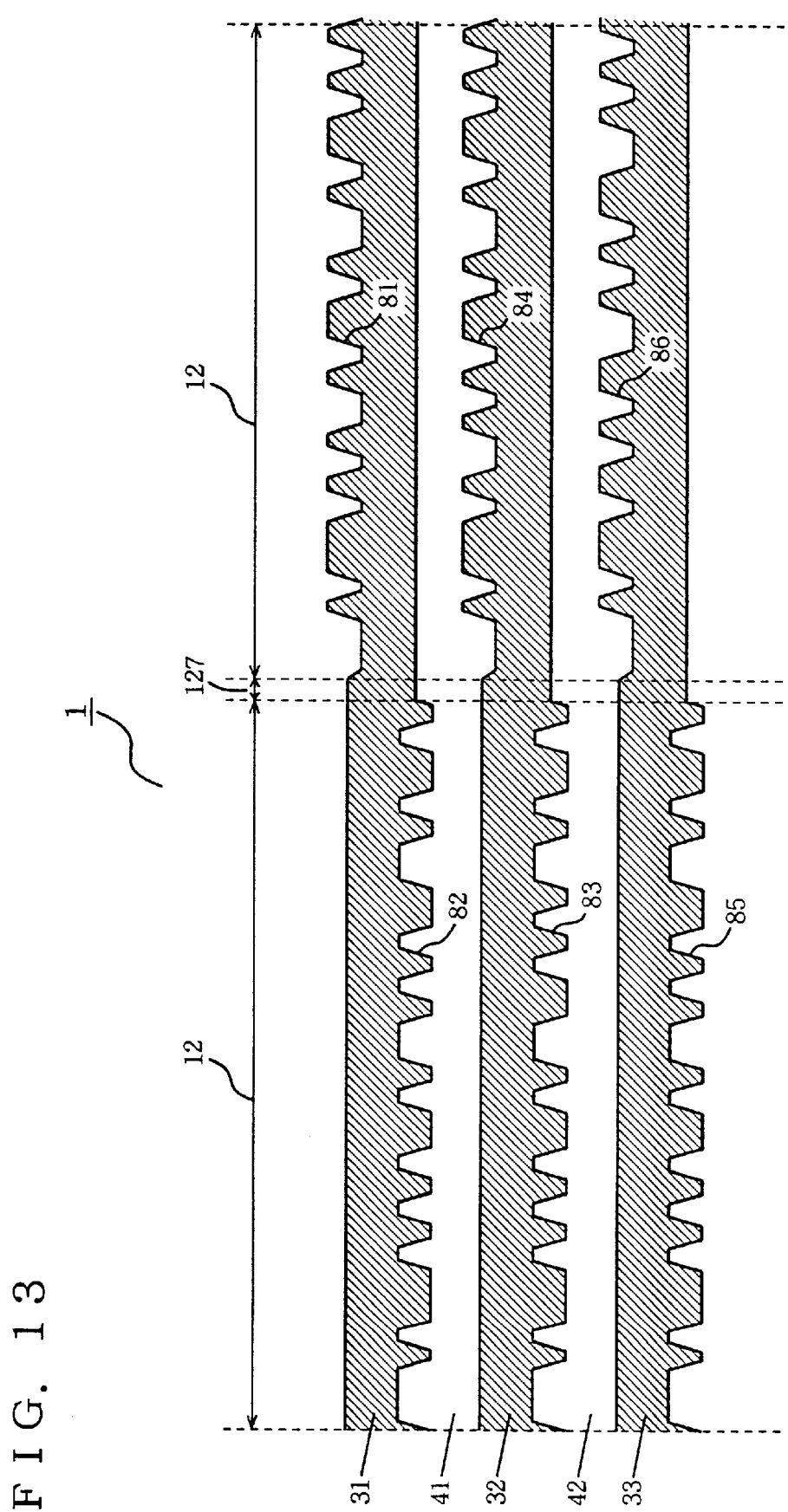
FIG. 13 is a plan view showing the structure of tracks in an address region in an optical recording medium according to an eighth embodiment of the invention.

FIG. 13 is a plan view showing the structure of tracks in address region 1 in an optical recording medium according to an eighth embodiment of the invention. As shown in FIG. 13, the optical recording medium has a similar track structure to the optical recording medium according to the seventh embodiment, but a wobble 81 is formed on a sidewall of groove 31 opposite to a sidewall on which a wobble 82 is formed, a wobble 84 is formed on a sidewall of groove 32 opposite to a sidewall on which a wobble 83 is formed, and a wobble 86 is formed on a sidewall of groove 33 opposite to a sidewall on which a wobble 85 is formed, unlike the seventh embodiment. Herein, the sidewalls on which wobbles 82, 83 and 85 are formed are not wobbled or flat in second address information region 12. Also in the optical recording medium according to this embodiment, wobble 81 is formed according to the address information of data recorded or to be recorded in a land (not shown) adjacent to groove 31, wobble 84 is formed according to the address information of data recorded or to be recorded in land 41, and wobble 86 is formed according to the address information of data recorded or to be recorded in land 42.

Figure 14:
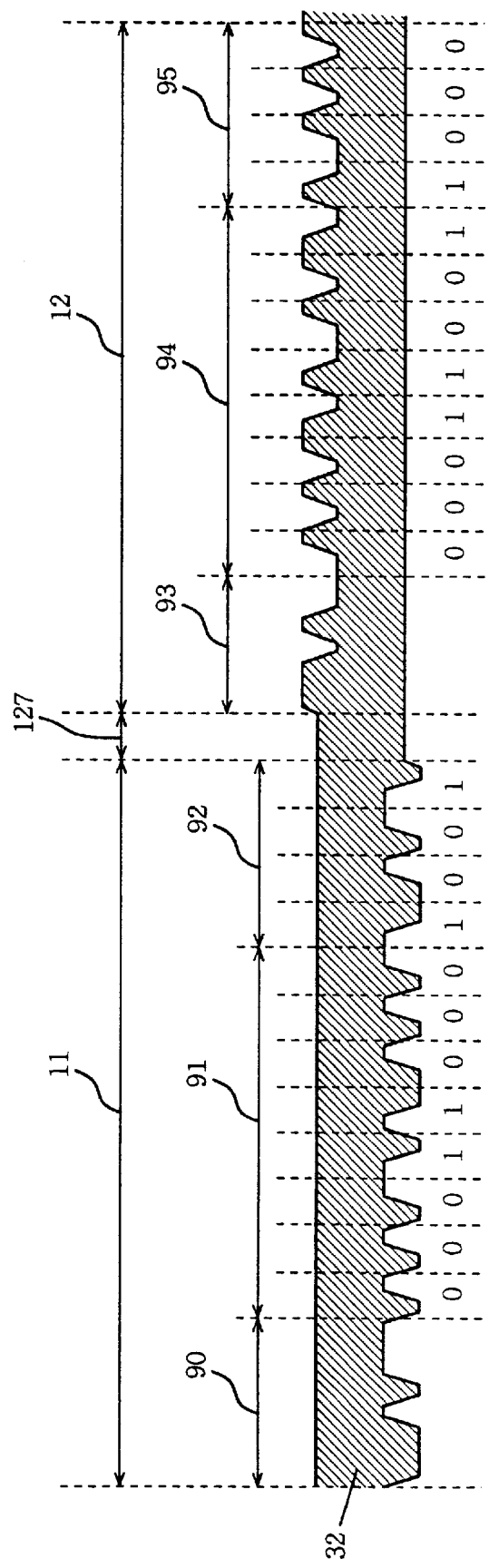
FIG. 14 is a view showing the format of address information recorded in the address region shown in FIG. 13.

FIG. 14 is a view showing the format of address information recorded in address region 1 shown in FIG. 13. As shown in FIG. 14, the format is similar to that shown in FIG. 12.

During reproducing data from the optical recording medium according to the eighth embodiment, if, for example, groove 32 is scanned with an irradiated laser beam, address information 91 included in first address information region 11 and address information 94 included in second address information region 12 are detected. Herein, address information 91 is recognized as the address information of data recorded or to be recorded in groove 32 by the detection of detection pattern 90. Meanwhile, address information 94 is recognized as the address information of data recorded or to be recorded in land 41 by scanning of land 41 adjacent to groove 32 by a laser beam and detection of detection pattern 93.

Ninth Embodiment

Figure 15:
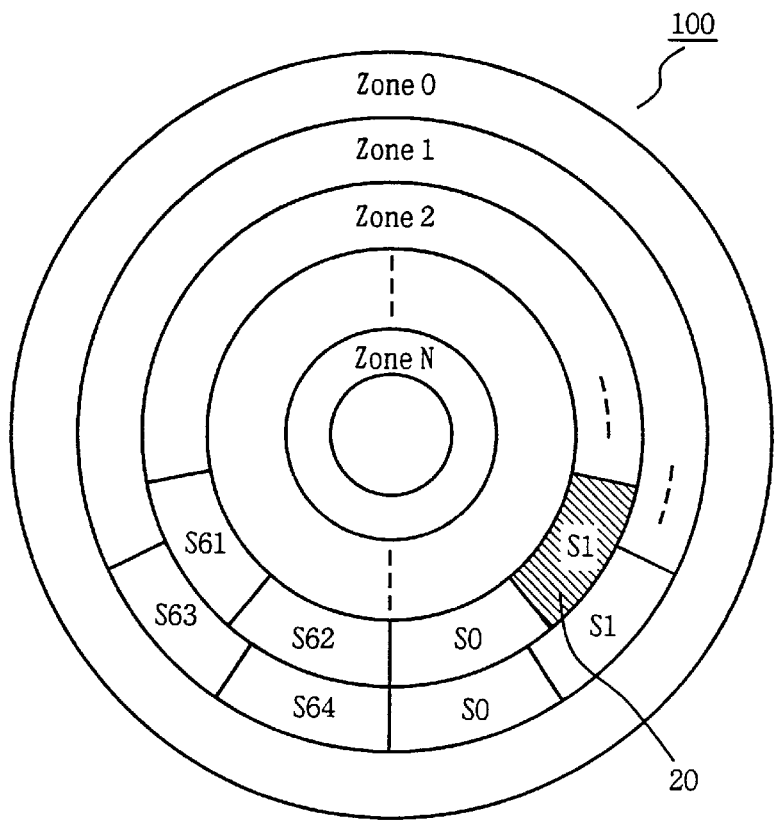
FIG. 15 is a plan view for use in illustration of the structure of an optical recording medium according to a ninth embodiment of the invention.

FIG. 15 is a plan view showing the structure of a main surface formed on a substrate 100 of an optical recording medium according to a ninth embodiment of the invention. As shown in FIG. 15, the main surface of the optical recording medium is segmented into (N+1) zones Zones 0 to N concentrically from the outer side and each of the zones is segmented into a plurality of sectors. Therefore, shadowed region 20 may be referred to as the region of sector S1 in zone Zone 2.

Herein, in the optical recording medium according to the first to eighth embodiments, bits for specifying a zone and a sector having data are included in each of address information. As a result, the address information of data recorded in region 20 in sector S1 in zone Zone2, for example, bits for specifying zone Zone2 and sector S1 are commonly included.

If, as in the first to eighth optical recording media, the address information of data recorded or to be recorded in a groove is recorded by wobbling a sidewall of the groove, and the address information of data recorded or to be recorded in a land is recorded by wobbling a sidewall of the land, the ratio of the address region in the tracks increases.

As a result, in an optical recording medium according to this embodiment, in order to reduce the ratio of the address region in tracks, common zone and sector information is recorded only once at the beginning of the address region, and unique information is recorded in each address information following the common zone and sector information.

Figure 16:
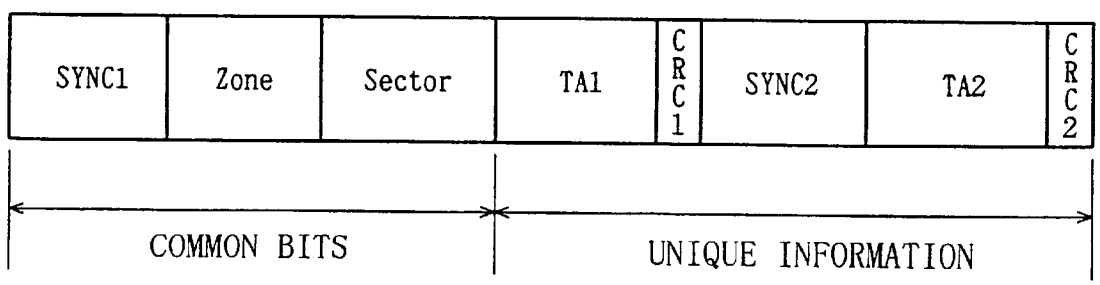
FIG. 16 is a view showing the format of an address region included in the shadowed portion in FIG. 15.

FIG. 16 is a view showing the format of address information recorded in shadowed region 20 in FIG. 15. As shown in FIG. 16, the address information recorded in region 20 includes common bits and unique information, and the common bits include a detection pattern SYNC1, zone information Zone for specifying zone Zone 2, and sector information Sector for specifying sector S1. The unique information includes a track address TA1, error detection codes CRC1 and CRC2, a detection pattern SYNC2, and a track address TA2. Herein, the address of first data is specified by the combination of the common bits, track address TA1 and error detection code CRC1, and the address of second data is specified by the combination of the common bits, detection pattern SYNC2, track address TA2 and error detection code CRC2.

Herein, detection pattern SYNC1 is a pattern for specifying the position of recording the common bits and track address TA1, and detection pattern SYNC2 is a pattern for specifying the position of recording track address TA2. As a result, the position of inserting a detection pattern changes depending upon the positional relation between the common bits, track address TA1 and track address TA2.

Figure 17:
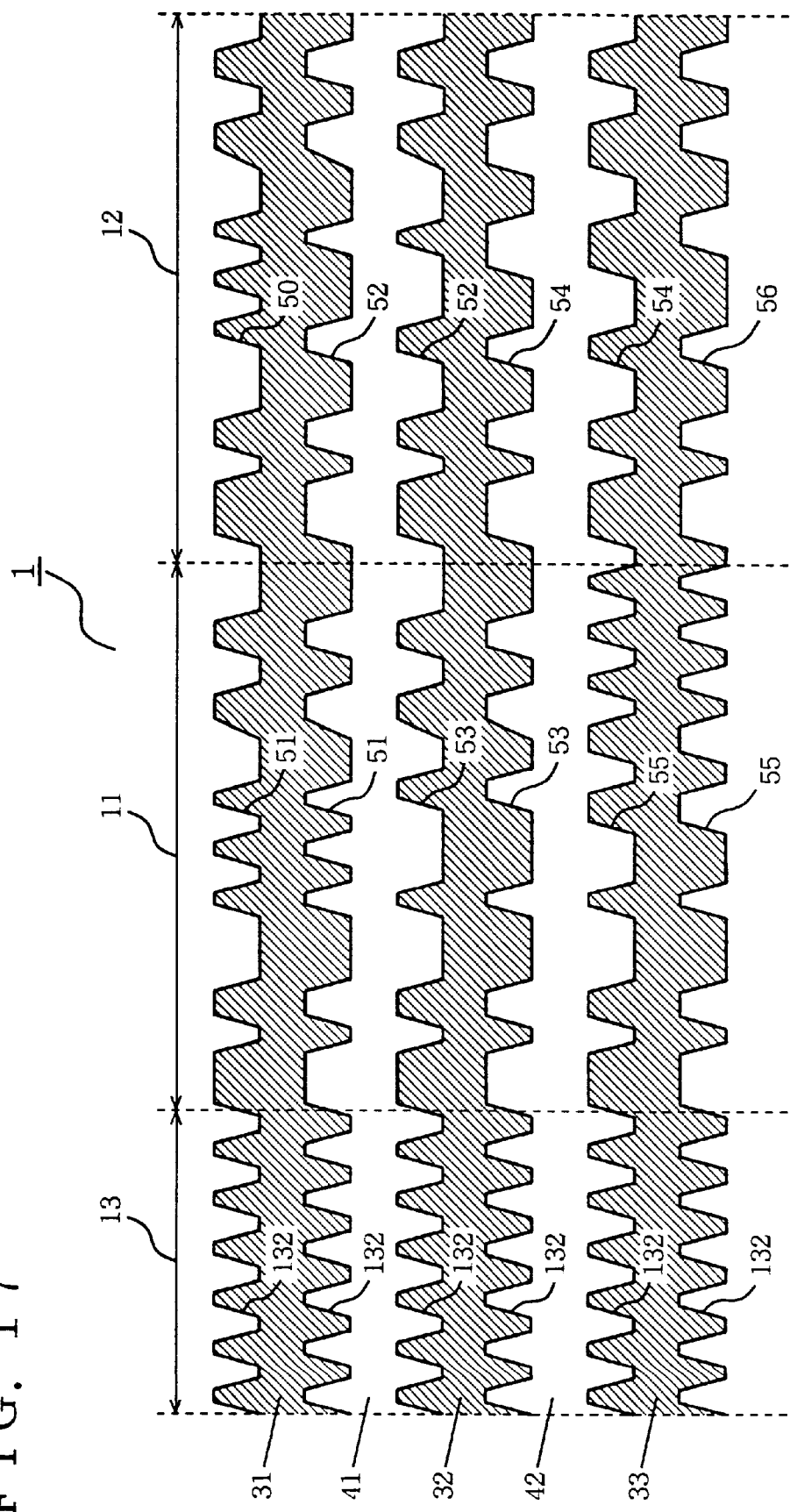
FIG. 17 is a plan view showing the structure of tracks in an address region in an optical recording medium according to a ninth embodiment of the invention.

FIG. 17 is a plan view showing the structure of tracks in an address region in an optical recording medium according to a ninth embodiment of the invention. As shown in FIG. 17, the track structure is similar to the track structure shown in FIG. 2, but a third address information region 13 recording common bits which include zone information Zone and sector information Sector is formed. In third address information region 13, wobbles 132 according to the common bits and in phase are formed on both sidewalls of grooves 31, 32 and 33.

Figure 18:
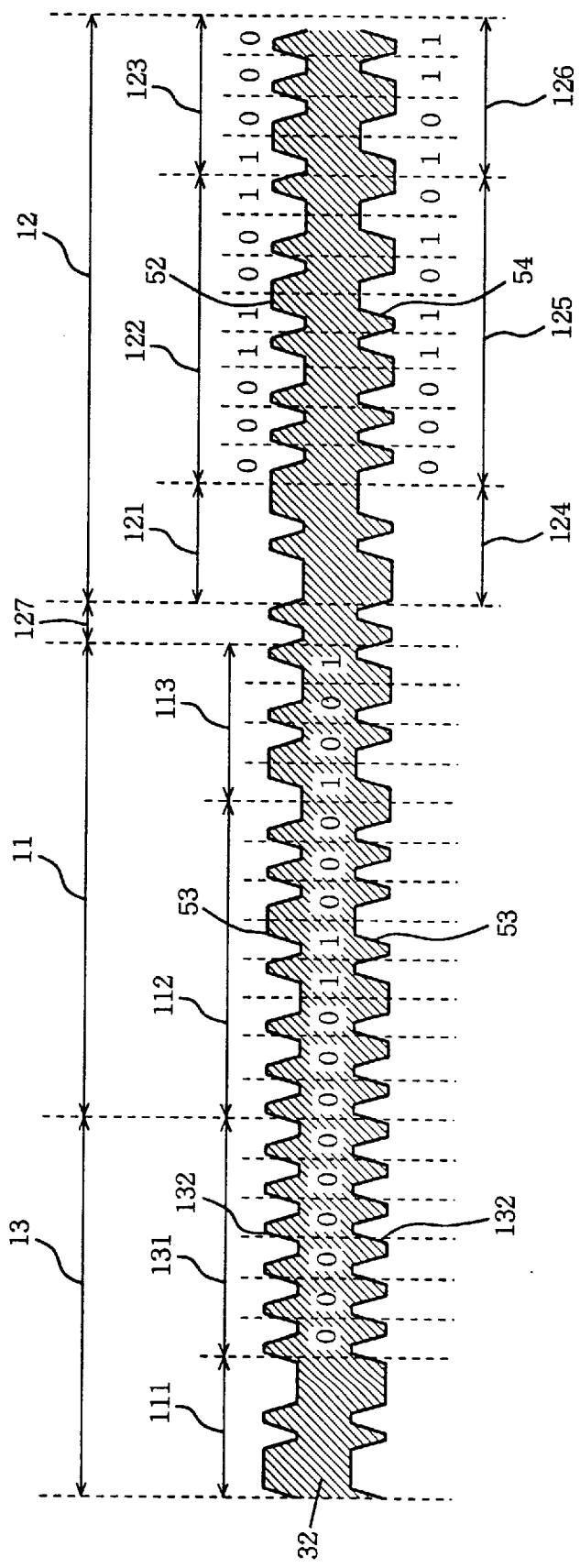
FIG. 18 is a view showing the format of address information recorded in the address region shown in FIG. 17.

FIG. 18 is a view showing the format of address information recorded in address region 1 shown in FIG. 17. As shown in FIG. 18, the format is similar to the format shown in FIG. 3, but third address region 13 including a detection pattern 111 and zone/sector information 131 is provided, and detection pattern 111 is removed from first address region 11.

Tenth Embodiment

Figure 19:
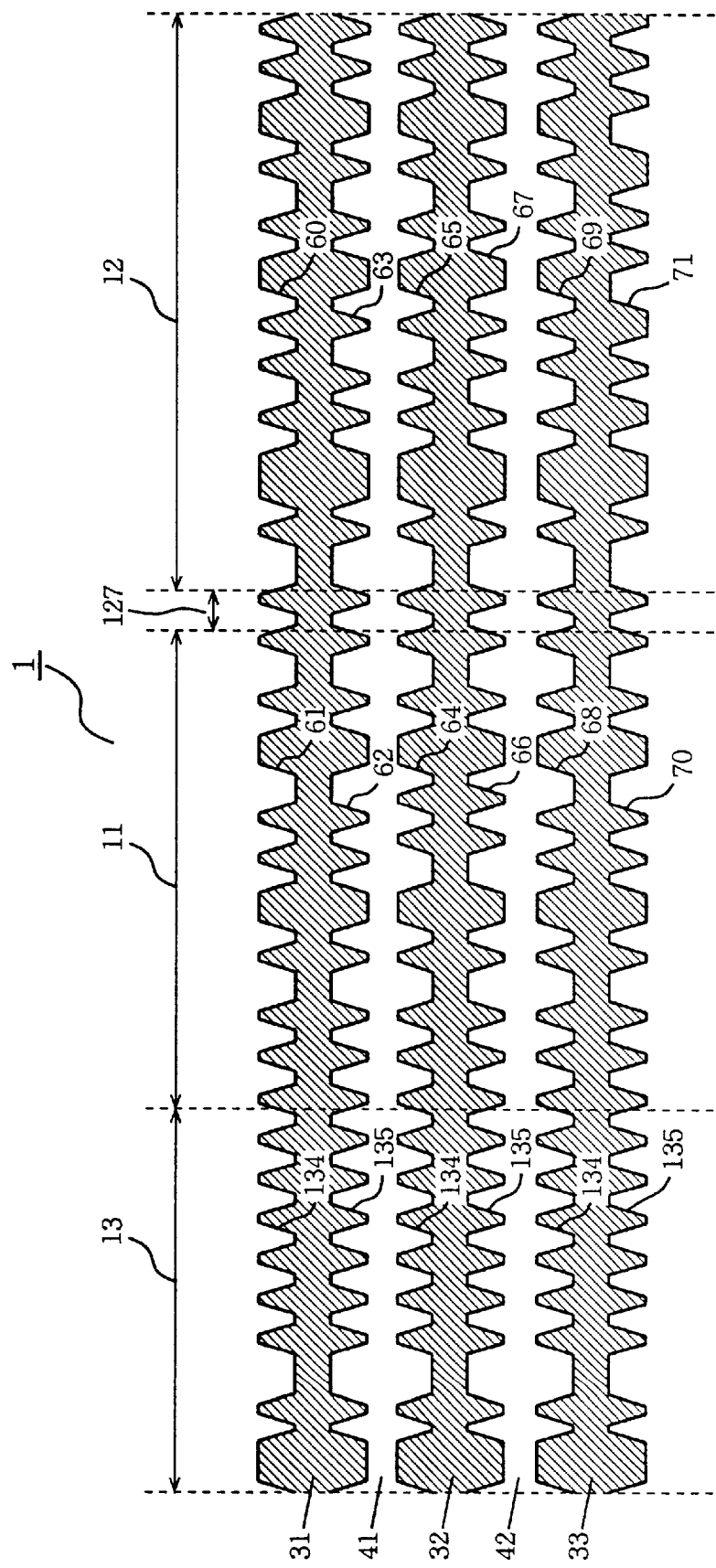
FIG. 19 is a plan view showing the structure of tracks in an address region in an optical recording medium according to a tenth embodiment of the invention.

FIG. 19 is a plan view showing the structure of tracks in address region 1 in an optical recording medium according to a tenth embodiment of the invention.

As shown in FIG. 19, the track structure is similar to the track structure shown in FIG. 9, but third address information region 13 is provided. In third address information region 13, wobbles 134 and 135 according to the common bits shown in FIG. 16 are formed symmetrically with respect to the central lines of grooves 31, 32 and 33 on both sidewalls of the grooves.

Figure 20:
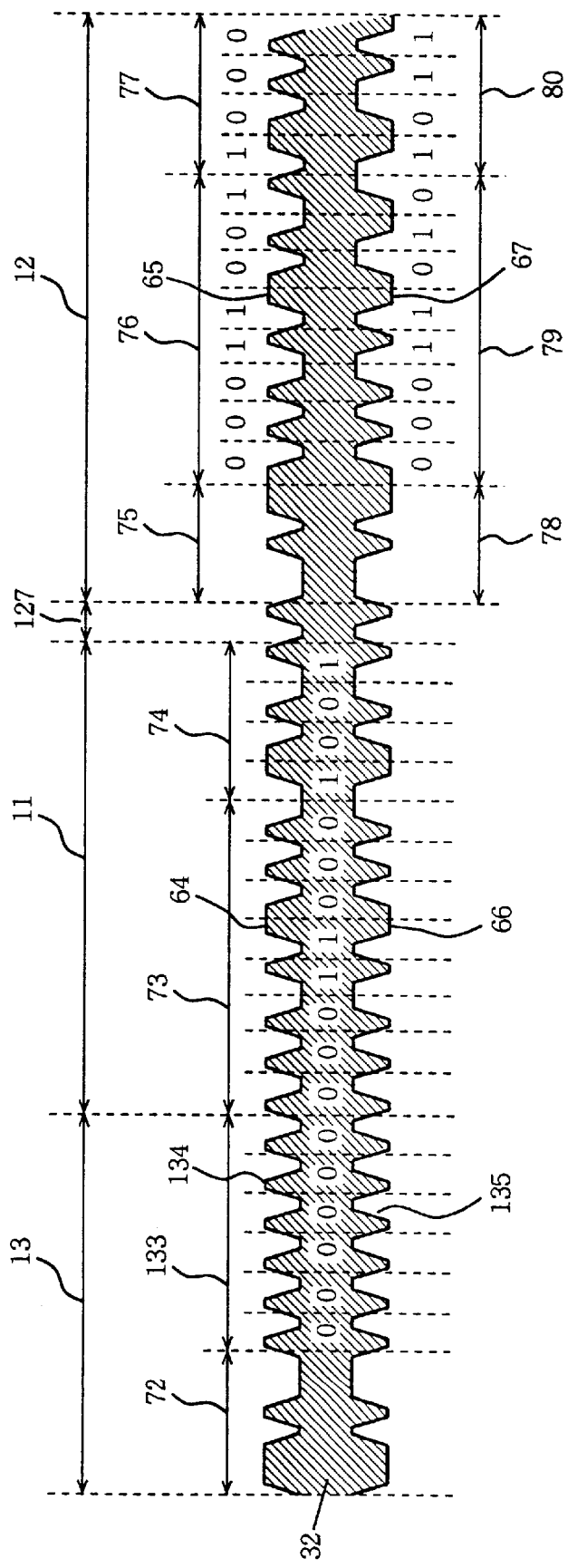
FIG. 20 is a view showing the format of address information recorded in the address region shown in FIG. 19.

FIG. 20 is a view showing the format of address information recorded in the tracks shown in FIG. 19. As shown in FIG. 20, the format is similar to the format shown in FIG. 10, but third address information region 13 including detection pattern 72 and zone/sector information 133 is additionally provided, and detection pattern 72 is removed from first address information region 11.

Eleventh Embodiment

Figure 21:
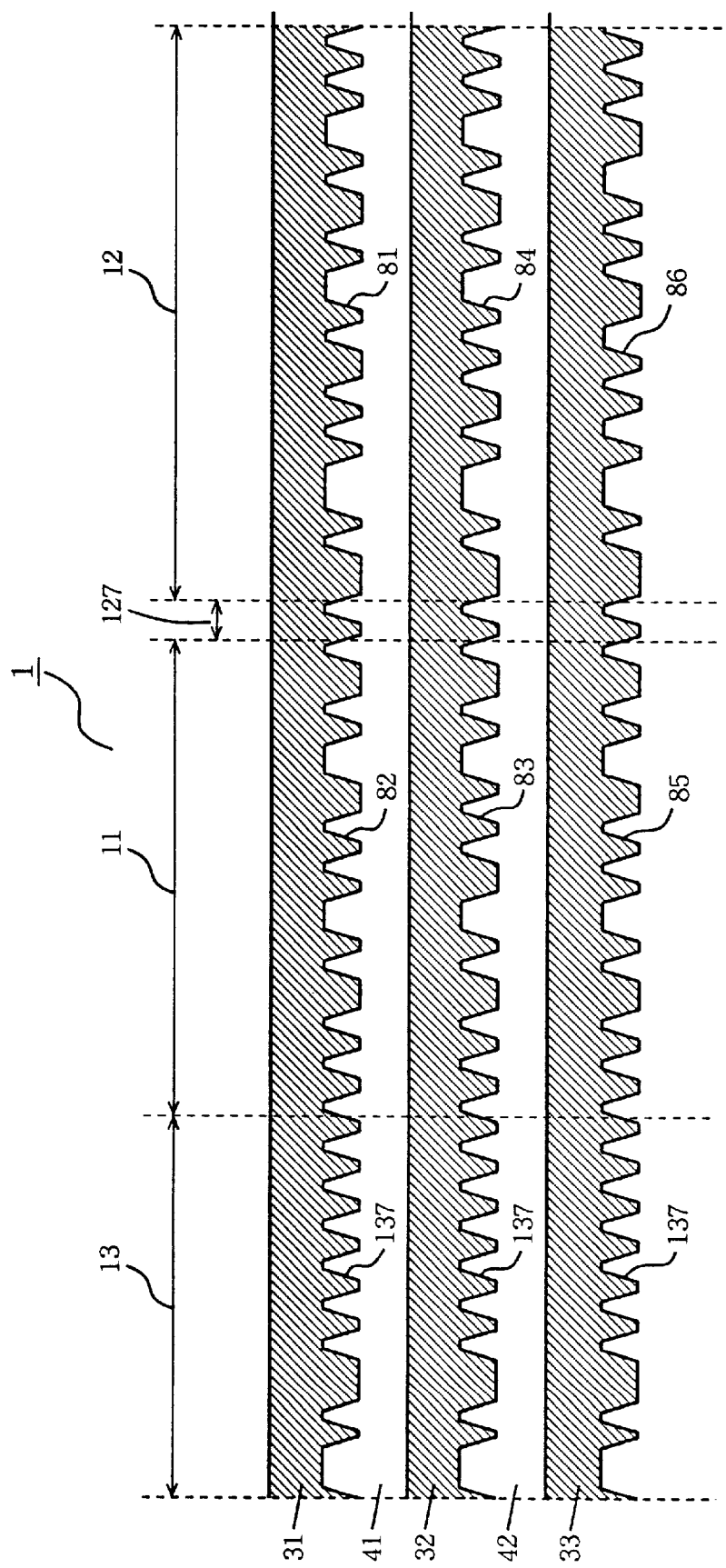
FIG. 21 is a plan view showing the structure of tracks in an address region in an optical recording medium according to an eleventh embodiment of the invention.

FIG. 21 is a plan view showing the structure of tracks in address region 1 in an optical recording medium according to an eleventh embodiment of the invention.

As shown in FIG. 21, the track structure is similar to the track structure shown in FIG. 11, but a third address information region 13 is additionally provided. In third address information region 13, a wobble 137 according to common bits shown in FIG. 16 is formed only on one sidewall at which wobbles 81 to 86 are formed.

Figure 22:
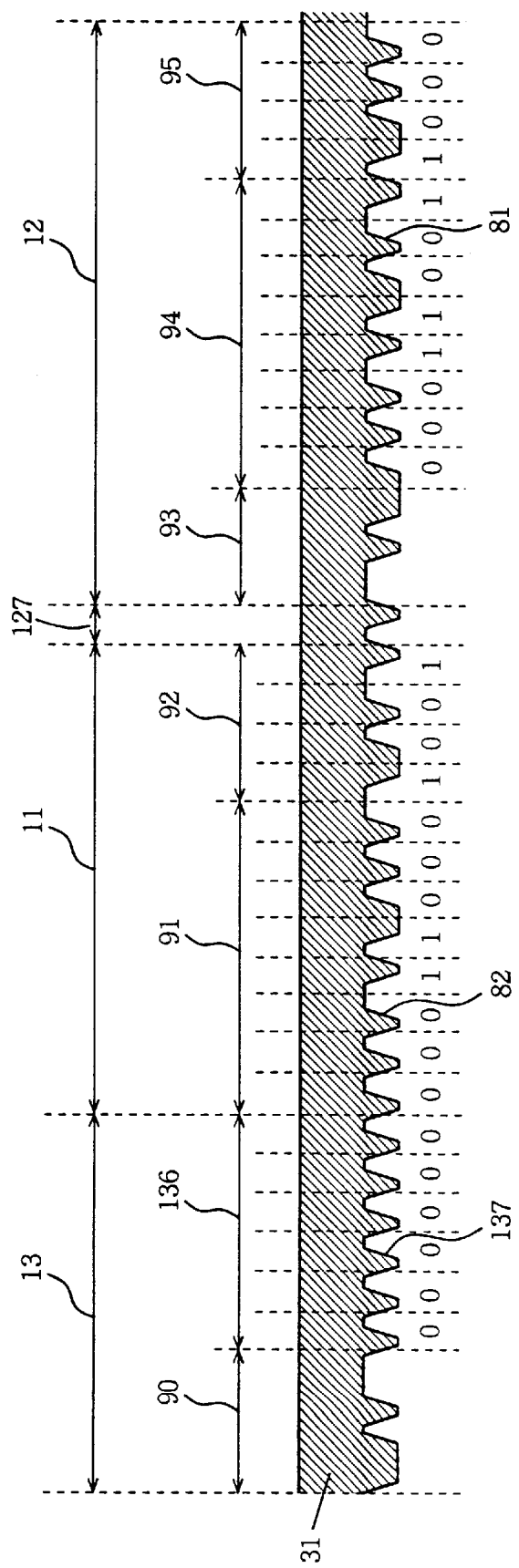
FIG. 22 is a view showing the format of address information recorded in the address region shown in FIG. 21.

FIG. 22 is a view showing the format of address information recorded in tracks shown in FIG. 21. As shown in FIG. 22, the format is similar to the format shown in FIG. 12, but a third address information region 13 including a detection pattern 90 and zone/section information 136 is additionally provided, and detection pattern 90 is removed from first address information region 11.

Twelfth Embodiment

Figure 23:
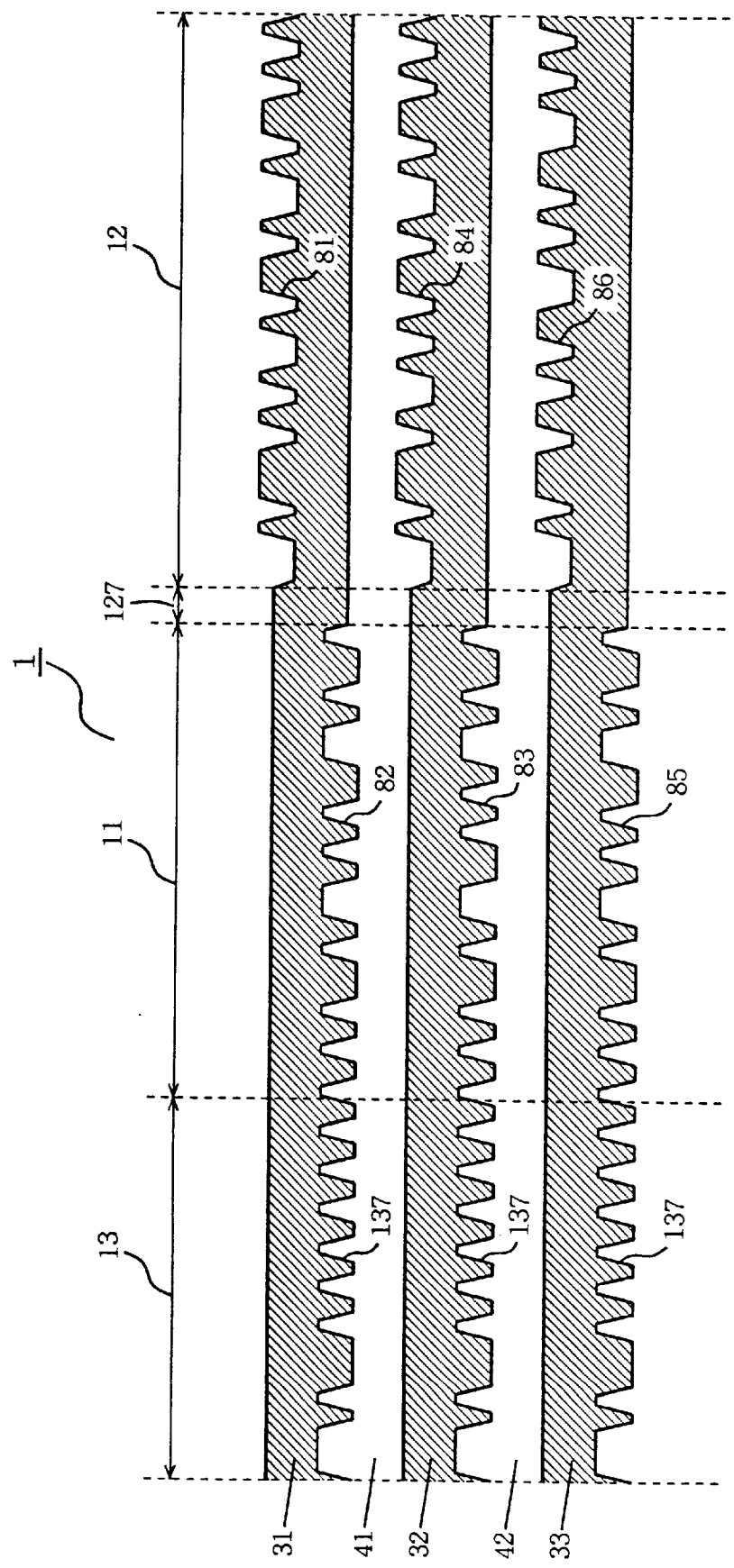
FIG. 23 is a plan view showing the structure of tracks in an address region in an optical recording medium according to a twelfth embodiment of the invention.

FIG. 23 is a plan view showing the structure of tracks in an address region 1 in an optical recording medium according to a twelfth embodiment of the invention.

As shown in FIG. 23, the track structure is similar to the structure shown in FIG. 13, but a third address information region 13 is additionally provided. In third address information region 13, a wobble 137 corresponding to the common bits shown in FIG. 16 is formed only on one sidewall in which each of wobbles 82, 83, and 85 is formed.

Figure 24:
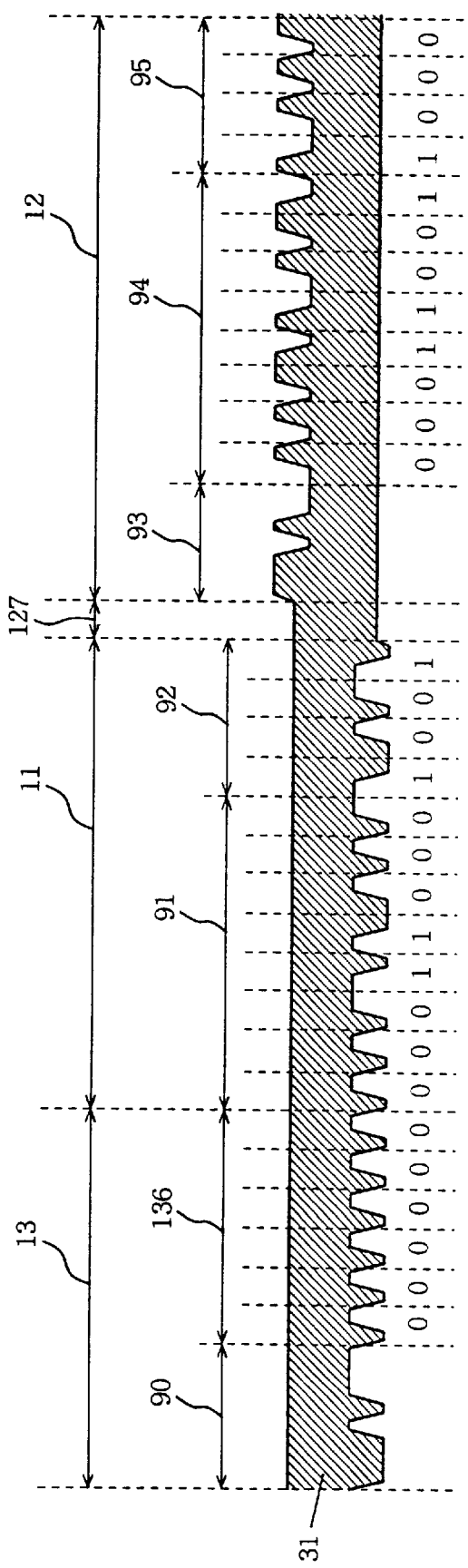
FIG. 24 is a view showing the format of address information recorded in the address region shown in FIG. 23.

FIG. 24 is a view showing the format of address information recorded on the tracks shown in FIG. 23. As shown in FIG. 24, the format has a similar structure to the format shown in FIG. 14, but third address information region 13 including detection pattern 90 and zone/sector information 136 is provided, and detection pattern 90 is removed from first address information region 11, unlike the format in FIG. 14.

Note that in recording address information to the optical recording medium according to the first to twelfth embodiments, Gray codes shown in the following Table 1 are used.

TABLE 1

| Address | Gray code |
| --- | --- |
| 0 | 00000000 |
| 1 | 00000001 |
| 2 | 00000011 |
| 3 | 00000010 |
| 4 | 00000110 |
| . | . |
| . | . |
| . | . |
| 14 | 00001001 |
| 15 | 00001000 |
| 16 | 00011000 |
| 17 | 00011001 |
| 18 | 00011011 |
| 19 | 00011010 |
| 20 | 00011110 |
| 21 | 00011111 |
| 22 | 00111111 |
| . | . |
| . | . |
| . | . |
| 253 | 10000011 |
| 254 | 10000001 |
| 255 | 10000000 |

More specifically, each address is converted into a corresponding Gray code in Table 1 and address information is recorded in first and second address information regions 11 and 12 in the form of the Gray code attached with an error correction code generated by a generation polynominal (X4+1). Herein, use of the Gray codes is one means for coding address information, and the distance between codes corresponding to adjacent addresses is always 1.

The structure of tracks in data region 2 in optical recording media according to the sixth to twelfth embodiments may be any of those shown in FIGS. 1, 4, 5, 6, and 8.

Note that, in the above embodiments, the optical recording medium is described by way of illustration, but the invention is by no means limited to such a medium, and may be similarly applied to any medium to/from which a signal can be recorded and reproduced.

Thirteenth Embodiment

Figure 25:
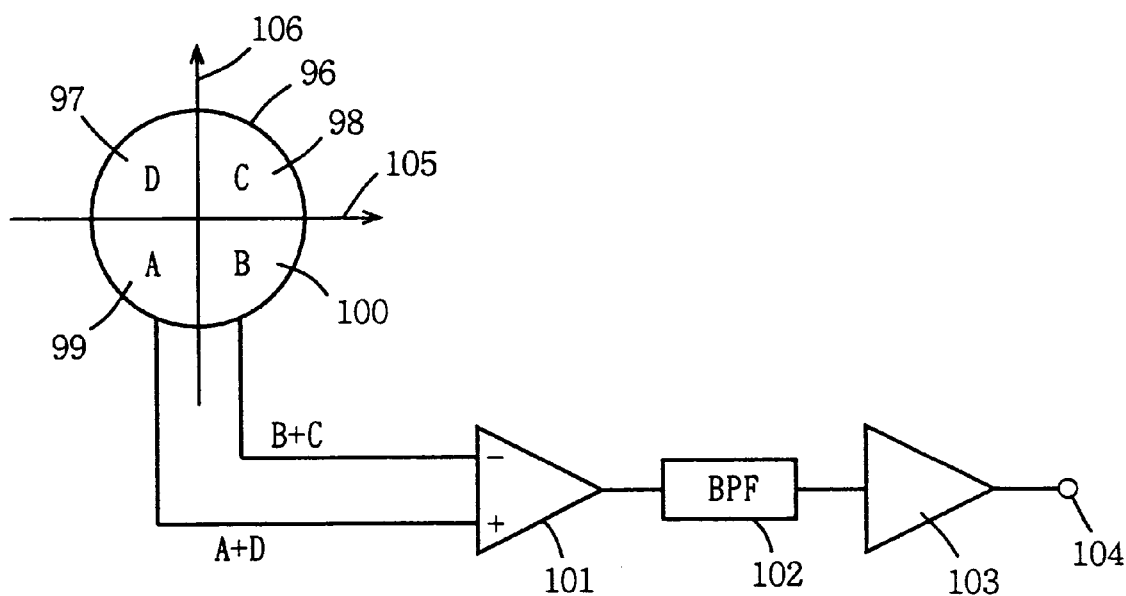
FIG. 25 is a view showing the structure of a reproducing apparatus for reproducing address information from an optical recording medium in which wobbles in phase are formed.

FIG. 25 is a view showing the structure of a reproducing apparatus for reproducing data from an optical recording medium according to each of the first to fifth and ninth embodiments, more specifically, a reproducing apparatus for reproducing data from such an optical recording medium in which both sidewalls of grooves 3, 31 to 33 are wobbled such that the width of these wobbles is constant in address region 1.

As shown in FIG. 25, the reproducing apparatus includes a main detector 96 included in an optical head (not shown), a differential amplifier 101 connected to main detector 96, a band-pass filter 102 connected to differential amplifier 101, a comparator 103 connected to band-pass filter 102, and a terminal 104 connected to comparator 103.

Herein, main detector 96 generates a reproducing signal by detecting and photoelectrically converting light reflected from an optical recording medium in response to radiation of a laser beam, and includes detection regions A99 and D97 as one detection means, and detection regions B100 and C98 as another detection means. Main detector 96 is positioned such that the direction denoted by arrow 105 is the tracking direction, while the direction denoted by arrow 106 is the tangential direction to the tracks.

The operation of the reproducing apparatus will be now described. A signal (B+C) generated in response to reflected light detected by detection regions B100 and C98 and a signal (A+D) generated in response to reflected light detected by detection region A99 and detection region D97 are input to differential amplifier 101, which then subtracts signal (B+C) from signal (A+D). The result of subtraction is input to band-pass filter 102. Band-pass filter 102 supplies comparator 103 with a signal removed of signal components other than in a prescribed frequency band centered around the frequency of wobbles formed in address region 1. Comparator 103 digitizes the supplied signal based on a prescribed reference voltage, and thus digitized signal is supplied to a system controller (not shown) through terminal 104, determined as address information and used for recording or reproducing data from the optical recording medium.

Fourteenth Embodiment

Figure 26:
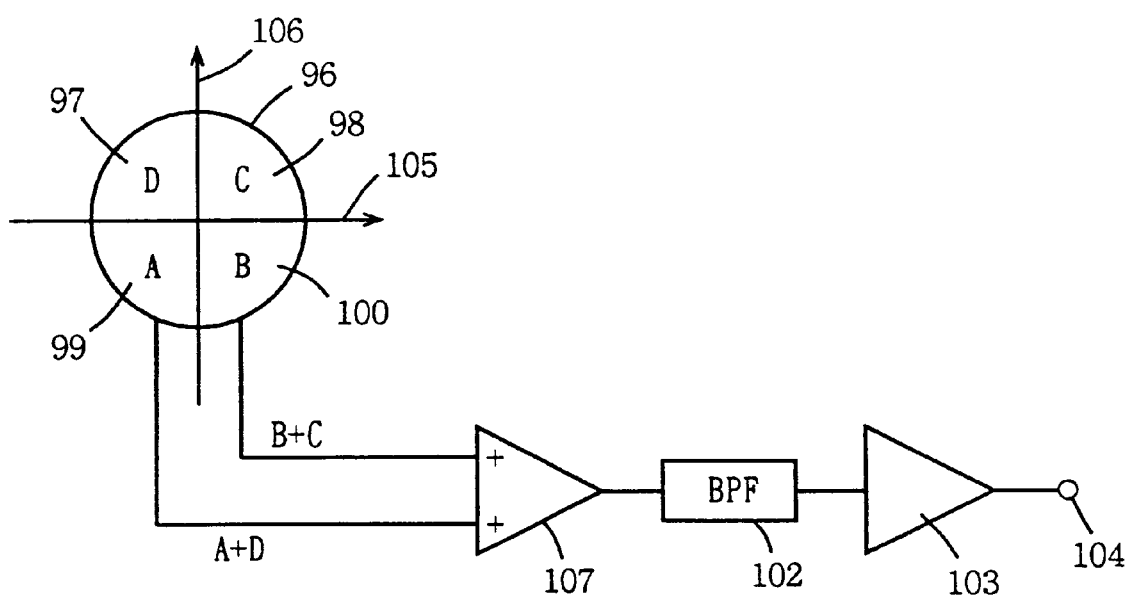
FIG. 26 is a view showing the structure of a reproducing apparatus for reproducing address information from an optical recording medium in which symmetrical wobbles are formed.

FIG. 26 is a view showing the structure of a reproducing apparatus for reproducing data from optical recording media according to the sixth to tenth embodiments, in other words a reproducing apparatus for reproducing data from such an optical recording medium in which both sidewalls of grooves 3, 31 to 33 are wobbled symmetrically with respect to the central lines of these grooves in address region 1.

As shown in FIG. 26, the reproducing apparatus has a similar structure to the apparatus according to the thirteenth embodiment, but an adder 107 is provided in place of differential amplifier 102.

The reproducing apparatus operates substantially similarly to the reproducing apparatus according to the thirteenth embodiment except that a signal (B+C) generated in response to reflected light detected by detection regions B100 and C98 and a signal (A+D) generated in response to reflected light detected by detection regions A99 and D97 are input to adder 107, which then adds signal (B+C) and signal (A+D).

As a result, by the reproducing apparatus according to this embodiment, address information may be reproduced depending upon the detection intensity of the entire reflected light from a groove or land irradiated with a laser beam.

Note that address information from any of optical recording media according to the seventh, eighth, eleventh and twelfth embodiments, in other words, address information in such an optical recording medium in which only one sidewall of grooves 3, 31 or 33 is wobbled in address region 1 may be reproduced by any of reproducing apparatuses according to the thirteenth and fourteenth embodiments.

Fifteenth Embodiment

Figure 27:
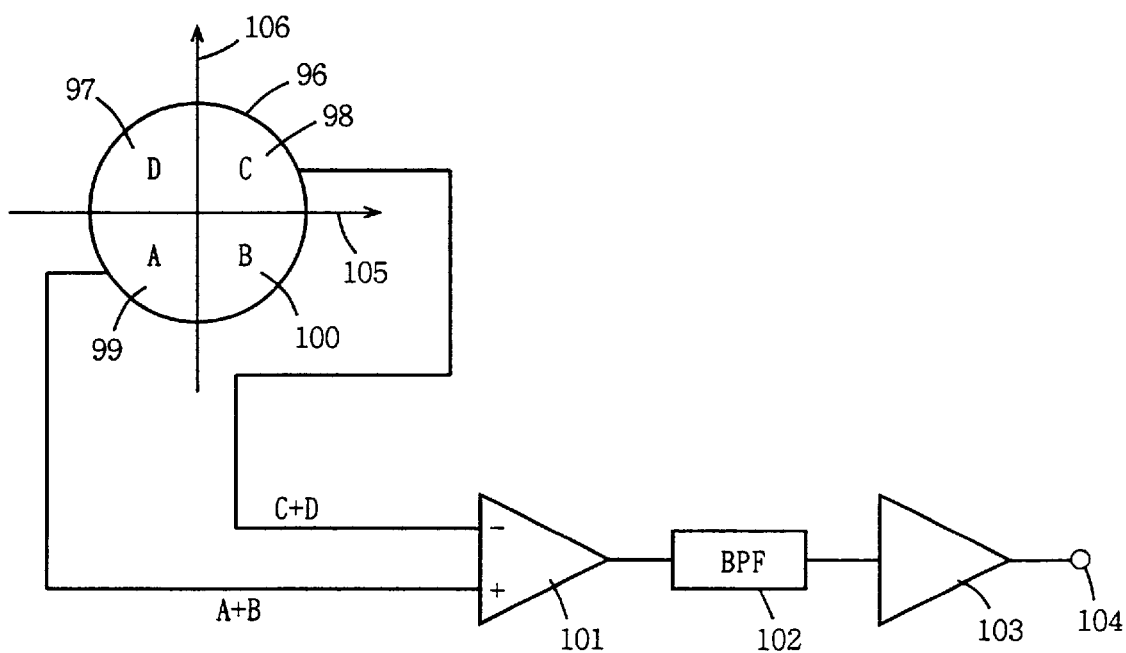
FIG. 27 is a view showing the structure of a reproducing apparatus for generating a clock signal from an optical recording medium in which intermittent and periodical grooves are formed.

FIG. 27 is a view showing the structure of a reproducing apparatus for reproducing data from an optical recording medium according to the fifth embodiment of the invention, and from any of optical recording media according to the sixth to twelfth embodiments having its data region 2 formed similarly to the optical recording medium according to the fifth embodiment.

The reproducing apparatus has a similar structure to the reproducing apparatus according to the thirteenth and fourteenth embodiments, but as shown in FIG. 27, the apparatus includes, as first detection means, detection regions A99 and B100 provided in series in the direction of arrow 106, in other words the tangential direction to the tracks, and, as second detection means, detection regions C98 and D97. Differential amplifier 101 is provided with a signal (A+B) generated in response to reflected light detected by detection regions A99 and B100 and a signal (C+D) generated in response to reflected light detected by detection regions C98 and D97, and subtracts signal (C+D) from signal (A+B).

In such a reproducing apparatus, a signal corresponding to a change in the intensity of reflected light in the tangential direction to the tracks is available, a clock signal having an improved SN ratio than a conventional case may be generated during reproducing data from data region 2 having intermittently and periodically formed groove 3.

Note that since the reproducing apparatus according to the fifteenth embodiment is principally effective in generating clock signals, and that the reproducing apparatuses according to the thirteenth or fourteenth embodiments are used also for reproducing address information.

What is claimed is:

1. A recording medium comprising a substrate having a main surface, said substrate comprising:
   at least first and second grooves formed at said main surface; and
   a land formed at said main surface and adjacent to and between said first and second grooves,
   a first part of a first sidewall on said land side of said first groove on a first side of said land, and a first part of a second sidewall on said land side of said second groove on a second side of said land are wobbled in phase according to the address of data recorded or to be recorded in said land, said first part of said first sidewall and said first part of said second sidewall being formed opposite to each other, wherein a second part of said second sidewall and a first part of a third sidewall opposite to said second sidewall are wobbled according to the address of data recorded or to be recorded in said second groove on said second side of said land.

2. The recording medium as recited in claim 1, wherein the distance between the first parts of said first and second sidewalls, and the distance between the second part of said second sidewall and the first part of said third sidewall are constant.

3. The recording medium as recited in claim 3, wherein said first parts of said first and second sidewalls are symmetrically formed, said second part of said second sidewall and said first part of said third sidewall are formed symmetrically.

4. A recording medium comprising a substrate having a main surface, said substrate comprising:
   at least one groove formed at said main surface and having first and second sidewalls, and a land formed at said main surface and adjacent to said groove with said second sidewall serving as a boundary plane,
   said first sidewall being flat, a first part of said second sidewall being wobbled according to the address of data recorded or to be recorded in said groove, a second part of said second sidewall being wobbled according to the address of data recorded or to be recorded in said land.

5. A recording medium comprising having a main surface, said substrate comprising:
   a groove formed at said main surface and having first and second sidewalls, and
   a land formed at said main surface and adjacent to said groove with said second sidewall serving as a boundary plane,
   a first part of said first sidewall being wobbled according to the address of data recorded or to be recorded in said groove, a first part of said second sidewall opposite to the first part of said first sidewall being flat, a second part of said second sidewall being wobbled according to the address of data recorded or to be recorded in said land, a second part of said first sidewall opposite to the second part of said second sidewall being flat.

6. A recording medium comprising a substrate having a main surface, said substrate comprising:
   at least first and second grooves formed at said main surface; and
   a land formed at said main surface and adjacent to and between said first and second grooves,
   a first part of a first sidewall on said land side of said first groove on a first side of said land, and a first part of a second sidewall on said land side of said second groove on a second side of said land are wobbled in phase according to the address of data recorded or to be recorded in said land, said first part of said first sidewall and said first part of said second sidewall being formed opposite to each other, wherein a second part of said second sidewall and a first part of a third sidewall opposite to said second sidewall are wobbled according to the address of data recorded or to be recorded in said second groove on said second side of said land, and wherein said second and third sidewalls are wobbled at a fixed interval in a region in said second groove on said second side of said land in which data is recorded or not recorded.

7. A recording medium comprising a substrate having a main surface, said substrate comprising:
   at least first and second grooves formed at said main surface; and
   a land formed at said main surface and adjacent to and between said first and second grooves,
   a first part of a first sidewall on said land side of said first groove on a first side of said land, and a first part of a second sidewall on said land side of said second groove on a second side of said land are wobbled in phase according to the address of data recorded or to be recorded in said land, said first part of said first sidewall and said first part of said second sidewall being formed opposite to each other, wherein a second part of said second sidewall and a first part of a third sidewall opposite to said second sidewall are wobbled according to the address of data recorded or to be recorded in said second groove on said second side of said land, and wherein said second and third sidewalls are symmetrically wobbled in a region in said second groove on said second side of said land in which data is recorded or not recorded.

8. A recording medium comprising a substrate having a main surface, said substrate comprising:
   at least first and second grooves formed at said main surface; and
   a land formed at said main surface and adjacent to and between said first and second grooves,
   a first part of a first sidewall on said land side of said first groove on a first side of said land, and a first part of a second sidewall on said land side of said second groove on a second side of said land are wobbled in phase according to the address of data recorded or to be recorded in said land, said first part of said first sidewall and said first part of said second sidewall being formed opposite to each other, wherein a second part of said second sidewall and a first part of a third sidewall opposite to said second sidewall are wobbled according to the address of data recorded or to be recorded in said second groove on said second side of said land, and wherein a fine clock mark is formed for each prescribed interval in a region in said second groove on said second side of said land in which data is recorded or to be recorded on at least one of said second and third sidewalls.

9. The recording medium as recited in claim 1, wherein said groove is intermittently and periodically formed in a region in which data is recorded or to be recorded, along the direction of tracks.

10. A recording medium comprising a plurality of concentrically arranged zones and a plurality of circumferentially arranged sectors provided for each of said plurality of zones, said plurality of sectors each including a plurality of grooves and a plurality of lands alternating with said plurality of grooves, said plurality of grooves being each wobbled according to an address of data recorded or to be recorded in a corresponding one of said grooves and a corresponding one of said lands, said wobbled grooves being arranged radially.

11. The recording medium as recited in claim 10, wherein said wobbled grooves each have a shared portion, a first portion and a second portion, said shared portion being wobbled according to zone information and sector information, said first portion being wobbled according to a first track address, said second portion being wobbled according to a second track address.

12. The recording medium as recited in claim 11, wherein said plurality of grooves wobbled each include successively said shared portion, said first portion and said second portion circumferentially.

13. The recording medium as recited in claim 12, wherein:

said shared portion includes a first sidewall being flat and a second sidewall provided opposite to said first sidewall and wobbled according to said zone information and said sector information;

said first portion includes a first sidewall being flat and provided on a same side as said first sidewall of said shared portion, and a second sidewall provided on a same side as said second sidewall of said shared portion and wobbled according to said first track address; and said second portion includes a first sidewall provided on a same side as said first sidewall of said shared portion and wobbled according to said second track address, and a second sidewall being flat and provided on a same side as said second sidewall of said shared portion.

* * * * *